US010996660B2

(12) United States Patent
Linder et al.

(10) Patent No.: US 10,996,660 B2
(45) Date of Patent: May 4, 2021

(54) AUGMENTED MANUFACTURING SYSTEM

(71) Applicant: Tulip Interfaces, Inc., Somerville, MA (US)

(72) Inventors: Natan Linder, Somerville, MA (US); Rony Kubat, Somerville, MA (US); Benjamin Weissmann, Somerville, MA (US); Mason Glidden, Somerville, MA (US); Douglas Sanchez, Somerville, MA (US); Marcus Boorstin, Somerville, MA (US)

(73) Assignee: Tulip Interfaces, Inc., Somerville, MA (US)

( * ) Notice: Subject to any disclaimer, the term of this patent is extended or adjusted under 35 U.S.C. 154(b) by 168 days.

(21) Appl. No.: 15/566,890

(22) PCT Filed: Apr. 17, 2016

(86) PCT No.: PCT/US2016/028013
§ 371 (c)(1),
(2) Date: Oct. 16, 2017

(87) PCT Pub. No.: WO2016/168785
PCT Pub. Date: Oct. 20, 2016

(65) Prior Publication Data
US 2018/0107198 A1    Apr. 19, 2018

Related U.S. Application Data
(60) Provisional application No. 62/149,496, filed on Apr. 17, 2015.

(51) Int. Cl.
*G05B 19/418*        (2006.01)
*G05B 19/4062*       (2006.01)
(Continued)

(52) U.S. Cl.
CPC ............ *G05B 19/4184* (2013.01); *B25F 5/00* (2013.01); *G05B 19/408* (2013.01);
(Continued)

(58) Field of Classification Search
CPC ...... G06Q 10/10; G06Q 10/06; G06Q 10/067; G06Q 10/06393; G06Q 10/06398;
(Continued)

(56) References Cited

U.S. PATENT DOCUMENTS 5,742,263 A    10/1998  Wang et al.
5,917,460 A     6/1999  Kodama
(Continued)

FOREIGN PATENT DOCUMENTS

DE    102012005880 A1    11/2012
WO    WO 2016/168785     10/2016
WO    WO 2016/168786     10/2016

OTHER PUBLICATIONS

Caudell et al., Augmented Reality: An Application of Heads-Up Display Technology to Manual Manufacturing Processes. IEEE. 1992. 659-69.
(Continued)

*Primary Examiner* — Kenneth M Lo
*Assistant Examiner* — Istiaque Ahmed

(57) ABSTRACT

An operator defines a process, such as a process for the manufacturing of a product, using templates that may be edited graphically. Each process includes a set of steps that a user must perform in order to accomplish the process. Each step in the process may be associated with one or more pieces of machinery on the floor to achieve the execution of the process, either in advance or at execution time. Each step may also provide various forms of instruction, monitoring, and feedback to aid the user of the associated machinery in performing the process. Data may be collected regarding the
(Continued)

user's performance, analyzed, and used to inform the operator who may in turn edit the process with the goal of improving its execution.

25 Claims, 16 Drawing Sheets

(51) Int. Cl.
*G05B 19/4065* (2006.01)
*G05B 19/408* (2006.01)
*G06Q 10/06* (2012.01)
*B25F 5/00* (2006.01)
*G06F 9/451* (2018.01)
*G06T 19/00* (2011.01)
*G06F 8/34* (2018.01)
*H04W 4/38* (2018.01)
*G06F 3/01* (2006.01)
*G06F 3/0481* (2013.01)
*G06F 3/0484* (2013.01)
*G06K 9/00* (2006.01)
*B23Q 17/00* (2006.01)
*G06T 7/50* (2017.01)
*G06T 7/30* (2017.01)
*G06T 7/70* (2017.01)
*G06F 3/042* (2006.01)

(52) U.S. Cl.
CPC ..... *G05B 19/4062* (2013.01); *G05B 19/4065* (2013.01); *G05B 19/4186* (2013.01); *G05B 19/41815* (2013.01); *G05B 19/41845* (2013.01); *G06F 3/011* (2013.01); *G06F 3/017* (2013.01); *G06F 3/0484* (2013.01); *G06F 3/04815* (2013.01); *G06F 8/34* (2013.01); *G06F 9/453* (2018.02); *G06K 9/00671* (2013.01); *G06Q 10/06393* (2013.01); *G06Q 10/06398* (2013.01); *G06T 19/006* (2013.01); *H04W 4/38* (2018.02); *B23Q 17/008* (2013.01); *G05B 2219/24048* (2013.01); *G05B 2219/32128* (2013.01); *G05B 2219/40104* (2013.01); *G05B 2219/50185* (2013.01); *G05B 2219/50203* (2013.01); *G06F 3/0425* (2013.01); *G06K 9/00355* (2013.01); *G06T 7/30* (2017.01); *G06T 7/50* (2017.01); *G06T 7/70* (2017.01)

(58) Field of Classification Search
CPC .................. G06Q 10/101; Y02P 90/86; G05B 2219/31449; G05B 19/4062; G05B 2219/50203; G05B 2219/50185; G05B 2219/40104; G05B 2219/32128; G05B 2219/24048; G06F 3/04815; G06F 3/011; G06F 3/017; G06F 3/0484; G06F 3/0425; G06T 19/006; G06T 7/50; G06T 7/30; G06T 7/70; G06T 19/20; G06T 7/60; G06T 7/80; H04W 4/38; G06K 9/00355; G06K 9/00671; B23Q 17/008
See application file for complete search history.

(56) References Cited

U.S. PATENT DOCUMENTS

| | | | |
|---|---|---|---|
| 5,960,214 A | 9/1999 | Sharpe, Jr. et al. | |
| 6,198,484 B1 | 3/2001 | Kameyama | |
| 6,388,639 B1 | 5/2002 | Hoshino et al. | |
| 6,684,121 B1* | 1/2004 | Lu | G05B 19/41865 700/108 |
| 7,724,278 B2 | 5/2010 | Maguire, Jr. | |
| 7,825,996 B2 | 11/2010 | Yamada et al. | |
| 8,179,449 B2 | 5/2012 | Larsson et al. | |
| 8,290,244 B2 | 10/2012 | Ha | |
| 8,487,838 B2 | 7/2013 | Lewis et al. | |
| 8,799,810 B1 | 8/2014 | Wheeler | |
| 8,953,889 B1 | 2/2015 | Worley, III et al. | |
| 9,256,988 B2 | 2/2016 | Wenger et al. | |
| 9,367,062 B2 | 6/2016 | Volpert | |
| 9,678,685 B1 | 6/2017 | Coffing et al. | |
| 9,721,386 B1 | 8/2017 | Worley, III et al. | |
| 2002/0120921 A1 | 8/2002 | Coburn et al. | |
| 2002/0122585 A1 | 9/2002 | Swift et al. | |
| 2002/0167462 A1 | 11/2002 | Lewis et al. | |
| 2003/0234797 A1 | 12/2003 | Williams et al. | |
| 2004/0128120 A1* | 7/2004 | Coburn | G05B 17/02 703/26 |
| 2005/0125441 A1* | 6/2005 | Clemens | G06Q 10/06 |
| 2005/0172258 A1* | 8/2005 | Nixon | G05B 23/0216 717/100 |
| 2005/0177263 A1* | 8/2005 | Chang | G06Q 10/06 700/108 |
| 2005/0275636 A1 | 12/2005 | Dehlin et al. | |
| 2006/0048092 A1 | 3/2006 | Kirkley, Jr. et al. | |
| 2006/0155582 A1 | 7/2006 | Brown | |
| 2006/0288301 A1 | 12/2006 | Hood et al. | |
| 2007/0047040 A1 | 3/2007 | Ha | |
| 2008/0032601 A1 | 2/2008 | Arcona et al. | |
| 2008/0158757 A1 | 7/2008 | G.K. et al. | |
| 2009/0089682 A1 | 4/2009 | Baier et al. | |
| 2009/0138116 A1 | 5/2009 | Austin et al. | |
| 2009/0189974 A1 | 7/2009 | Deering | |
| 2009/0254843 A1 | 10/2009 | Van Wie et al. | |
| 2009/0313584 A1 | 12/2009 | Kerr et al. | |
| 2010/0023156 A1 | 1/2010 | Trepina et al. | |
| 2010/0217612 A1* | 8/2010 | Apacible | G06F 16/22 705/1.1 |
| 2010/0226535 A1 | 9/2010 | Kimchi et al. | |
| 2011/0032252 A1 | 2/2011 | Ohta | |
| 2011/0115887 A1 | 5/2011 | Yoo et al. | |
| 2011/0126142 A1* | 5/2011 | Zhou | G05B 19/4183 715/771 |
| 2011/0193939 A1 | 8/2011 | Vassigh et al. | |
| 2011/0205341 A1 | 8/2011 | Wilson et al. | |
| 2011/0231787 A1 | 9/2011 | Tseo et al. | |
| 2011/0242134 A1 | 10/2011 | Miller et al. | |
| 2011/0267456 A1 | 11/2011 | Adermann | |
| 2012/0013613 A1 | 1/2012 | Vesely | |
| 2012/0086727 A1 | 4/2012 | Korah et al. | |
| 2012/0194418 A1 | 8/2012 | Osterhout et al. | |
| 2012/0249741 A1 | 10/2012 | Maciocci et al. | |
| 2012/0256954 A1 | 10/2012 | Soon-Shiong | |
| 2012/0268493 A1 | 10/2012 | Hayakawa | |
| 2012/0287040 A1 | 11/2012 | Moore et al. | |
| 2013/0007672 A1 | 1/2013 | Taubman | |
| 2013/0027517 A1 | 1/2013 | Kim et al. | |
| 2013/0104087 A1 | 4/2013 | Mlyniec et al. | |
| 2013/0106674 A1 | 5/2013 | Wheeler et al. | |
| 2013/0117707 A1 | 5/2013 | Wheeler | |
| 2013/0139082 A1 | 5/2013 | Wheeler et al. | |
| 2013/0178257 A1 | 7/2013 | Langseth | |
| 2013/0182082 A1 | 7/2013 | Hayashi | |
| 2013/0184847 A1 | 7/2013 | Fruh et al. | |
| 2013/0188021 A1 | 7/2013 | Sim | |
| 2013/0229524 A1 | 9/2013 | Vovkushevsky et al. | |
| 2013/0237811 A1 | 9/2013 | Mihailescu et al. | |
| 2013/0241805 A1 | 9/2013 | Gomez | |
| 2013/0246967 A1 | 9/2013 | Wheeler et al. | |
| 2013/0265218 A1 | 10/2013 | Moscarillo | |
| 2013/0325155 A1 | 12/2013 | Ryznar et al. | |
| 2013/0328762 A1 | 12/2013 | McCulloch et al. | |
| 2013/0335301 A1 | 12/2013 | Wong et al. | |
| 2013/0343601 A1 | 12/2013 | Jia et al. | |
| 2014/0025834 A1 | 1/2014 | Mergener | |
| 2014/0070924 A1 | 3/2014 | Wenger et al. | |
| 2014/0172148 A1 | 6/2014 | Miller | |
| 2014/0184397 A1 | 7/2014 | Volpert | |
| 2014/0208390 A1 | 7/2014 | Brown et al. | |
| 2014/0279893 A1 | 9/2014 | Branton | |
| 2014/0282282 A1 | 9/2014 | Holz | |

(56) References Cited

U.S. PATENT DOCUMENTS

| | | |
|---|---|---|
| 2014/0327628 A1 | 11/2014 | Tijssen et al. |
| 2014/0333667 A1 | 11/2014 | Jung et al. |
| 2014/0354528 A1 | 12/2014 | Laughlin et al. |
| 2014/0354603 A1 | 12/2014 | Davis et al. |
| 2015/0040074 A1 | 2/2015 | Hofmann et al. |
| 2015/0146007 A1 | 5/2015 | Dusik et al. |
| 2015/0268469 A1 | 9/2015 | Marsh et al. |
| 2016/0253563 A1 | 9/2016 | Lam et al. |
| 2017/0364234 A1 | 12/2017 | Ligameri et al. |
| 2018/0107191 A1 | 4/2018 | Kubat et al. |
| 2018/0107198 A1 | 4/2018 | Linder et al. |
| 2018/0113598 A1 | 4/2018 | Linder et al. |
| 2018/0203437 A1 | 7/2018 | Kubat et al. |

OTHER PUBLICATIONS

Extended European Search Report for European Application No. 16780969.8 dated Feb. 18, 2019.
Extended European Search Report dated Nov. 19, 2018 in connection with European Application No. 16780970.6.
Extended European Search Report dated Nov. 20, 2018 in connection with European Application No. 16780971.4.
International Search Report and Written Opinion for International Application No. PCT/US2016/28013 dated Jul. 29, 2016.
International Preliminary Report on Patentability for International Application No. PCT/US2016/28013 dated Oct. 26, 2017.
International Search Report and Written Opinion for International Application No. PCT/US2016/28014 dated Sep. 27, 2016.
International Preliminary Report on Patentability for International Application No. PCT/US2016/28014 dated Oct. 26, 2017.
International Search Report and Written Opinion for International Application No. PCT/US2016/28015 dated Aug. 5, 2016.
International Preliminary Report on Patentability for International Application No. PCT/US2016/28015 dated Oct. 26, 2017.
International Search Report and Written Opinion for International Application No. PCT/US2016/28016 dated Jan. 24, 2017.
International Preliminary Report on Patentability for International Application No. PCT/US2016/28016 dated Oct. 26, 2017.
[No Author Listed], Human Machine Interface (HMI) Guide. Texas Instruments. Industrial Automation Solutions. 2014. 9 pages.
Asato et al., "Analysis of open CNC architecture for machine tools," Journal of the Brazillian Society of Mechanical Sciences. 2002;24(3)5.
Chen et al., "Code-Centric RFID System Based on Software Agent Intelligence," IEEE Intelligent Systems. 2010. 13 pages.
Hebert, "How to link machine controls to IT systems," Control Design. 2015. https://www.controldesign.com/articles/2015/how-to-link-machine-controls-to-it-systems/?show=all Jun. 8, 2015. Last accessed Oct. 26, 2017. 4 pages.

Extended European Search Report for European Application No. 16780972.2 dated Jun. 26, 2019.
Ellingwood, "The Docker Ecosystem: An Overview of Containerization." The Docker Ecosystem. https://digitalocean.com/community/tutorials/the-docker-ecosystem-an-overview-of-containerization. 2015. 10 pages.
Applicant-Initiated Interview Summary dated Sep. 4, 2018 From the US Patent and Trademark Office Re. U.S. Appl. No. 15/785,126. (3 Pages).
Applicant-Initiated Interview Summary dated Aug. 13, 2018 From the US Patent and Trademark Office Re. U.S. Appl. No. 15/785,126. (3 Pages).
International Preliminary Report on Patentability dated Oct. 17, 2017 From the International Searching Authority Re. Application No. PCT/US2016/028013. (10 Pages).
International Search Report and the Written Opinion dated Aug. 5, 2016 From the International Searching Authority Re. Application No. PCT/US2016/028013. (12 Pages).
Interview Summary dated Mar. 7, 2019 from the US Patent and Trademark Office Re. U.S. Appl. No. 15/785,126. (3 Pages).
Interview Summary dated Apr. 9, 2020 from the US Patent and Trademark Office Re. U.S. Appl. No. 15/785,126. (3 Pages).
Official Action dated May 1, 2019 From the US Patent and Trademark Office Re. U.S. Appl. No. 15/785,126. (24 Pages).
Official Action dated Nov. 12, 2019 From the US Patent and Trademark Office Re. U.S. Appl. No. 15/785,126. (20 Pages).
Official Action dated Dec. 21, 2018 From the US Patent and Trademark Office Re. U.S. Appl. No. 15/785,126. (22 Pages).
Official Action dated May 29, 2018 From the US Patent and Trademark Office Re. U.S. Appl. No. 15/785,126. (20 Pages).
Official Action dated Jul. 31, 2020 from the US Patent and Trademark Office Re. U.S. Appl. No. 15/785,126. (32 pages).
Restriction Official Action dated Mar. 19, 2018 From the US Patent and Trademark Office Re. U.S. Appl. No. 15/785,126. (20 Pages).
Supplementary European Search Report and the European Search Opinion dated Feb. 18, 2019 From the European Patent Office Re. Application No. 16780969.8. (14 Pages).
Communication Pursuant to Article 94(3) EPC dated Jun. 9, 2020 From the European Patent Office Re. Application No. 16780969.8. (11 Pages).
Notice of Allowance dated Sep. 30, 2020 from the US Patent and Trademark Office Re. U.S. Appl. No. 15/785,126. (22 pages).
Interview Summary dated Sep. 11, 2020 from the US Patent and Trademark Office Re. U.S. Appl. No. 15/785,126. (3 pages).
Interview Summary dated Sep. 14, 2020 from the US Patent and Trademark Office Re. U.S. Appl. No. 15/785,126. (3 pages).

* cited by examiner

AUGMENTED MANUFACTURING SYSTEM

CROSS REFERENCE TO RELATED APPLICATIONS

This application is a national stage filing under 35 U.S.C. § 371 of International Application No. PCT/US2016/028013, filed on Apr. 17, 2016, which claims priority to U.S. Provisional Application No. 62/149,496, filed on Apr. 17, 2015. Each of these applications is incorporated herein by reference in its entirety.

FIELD

This disclosure relates to methods and systems for facilitating manufacturing, including embodiments utilizing augmented reality to facilitate the creation and execution of manufacturing processes.

BACKGROUND

Modern factories are increasingly equipped with digital technologies. Manufacturing IT is often installed piecemeal, resulting in a mix of proprietary and open machine interfaces using multiple machine protocols. Interoperability between existing technologies is an expensive challenge. The diversity of digital interfaces and protocols makes data collection difficult and expensive. Data is often siloed in separate systems that require custom engineering effort and manual labor to facilitate data transfer from one system to another.

One of the outcomes of this heterogeneous mix of IT in manufacturing is the continued use of manual, analog means of manufacturing management. Paper still dominates manufacturing in a way that has been long superseded by digital technologies in many other industries. Key performance indicators (KPIs) are often tracked within the factory with hand-drawn graphs on paper or whiteboards making it difficult to track these metrics over meaningful timeframes.

The lack of real-time data about the factory floor makes factories slow to adapt to changes and address problems as they occur. Existing factory floor IT implementations are insufficient given the needs of manufacturers to remain competitive by increasing product quality, reducing product errors, remaining flexible to changes and managing a diverse workforce.

Existing Human-Machine Interfaces (HMIs) are inflexible in both physical (i.e. the location of buttons, meters, etc.) and virtual domains (i.e. computer displays of machine interfaces). They are typically programmed to work with specific devices, such as specific PLCs, making reconfiguration require reprogramming at the HMI. These limitations limit the ability of production engineers to deploy the same HMI to multiple locations and to update a manufacturer's Standard Operating Procedures (SOP). The focus of existing HMIs is the facilitation of machine automation and control by a human operator; they unfortunately do not provide interfaces for operators on the production lines that guide, assist or measure the human aspect of production work on manufacturing shop floors.

Existing control systems for managing and monitoring the work on a factory floor, i.e., "manufacturing execution systems" ("MES"), track manufacturing information in real time, receiving up-to-the-minute data from robots, machine monitors and employees. However, they are complicated to configure, centralized, and expensive.

A need exists, therefore, for systems and methods that facilitate manufacturing that overcome these disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of operating a manufacturing system that may be executed by at least one processor capable of executing instructions encoded on a computer-readable medium. The method includes defining at least one manufacturing process using an interactive template retrievable from a storage, wherein the at least one process includes at least one step; receiving at least one modification to the process via the interactive template from at least one operator; gathering data related to the performance of the at least one step of the process; and converting the gathered data related to the performance of the at least one step of the process into manufacturing results data.

In one embodiment, the method further includes tracking the identity of the at least one operator making the at least one modification to the process.

In one embodiment, the process further includes at least one conditional test. The at least one conditional test may be conditioned on gathered data.

In one embodiment, the storage is network connected.

In one embodiment, the method further includes allocating at least one piece of machinery to perform at least one step of the process. The at least one piece of machinery may be a plurality of pieces of machinery of a plurality of types.

In another aspect, embodiments relate to a manufacturing system. The system includes a storage providing at least one interactive template wherein the at least one interactive template defines at least one manufacturing process including at least one step and the at least one interactive template is configured to interface with at least one operator to enable the at least one operator to modify the process; and a processing device configured to gather data related to a performance of the at least one step of the at least one process and further configured to convert the gathered data into manufacturing results data.

In one embodiment, the processing device is further configured to track the identity of the at least one operator modifying the process.

In one embodiment the process further includes at least one conditional test. The at least one conditional test may be conditioned on gathered data.

In one embodiment, the storage is network connected.

In one embodiment the system further includes at least one piece of machinery for performing at least one step of the process. The at least one piece of machinery may be a plurality of pieces of machinery of a plurality of types.

In yet another aspect, embodiments relate to a server for facilitating manufacturing. The server includes at least one interactive template retrievable from the server, wherein the at least one interactive template is used to define at least one manufacturing process including at least one step; and at least one interface for presenting the interactive template to at least one operator to enable the at least one operator to create a process, view a process, test a process, or modify a process in substantially real time.

In one embodiment, the server further includes storage for recording the identity of the at least one operator interacting with the interactive template. The storage may be network connected.

In one embodiment, the testing the process involves its execution on at least one piece of machinery.

In one embodiment, the at least one interactive template is configured to receive at least one operational parameter from the at least one piece of machinery. The at least one interactive template may display the received at least one operational parameter in at least substantially real time. The interactive template may not execute in the absence of the at least one piece of machinery. The operator may associate at least one piece of machinery with the process when the process is executed.

In one embodiment, testing the process includes simulating the execution of the process.

In one embodiment the server is further configured to identify errors in the created process prior to execution or the runtime configuration.

In yet another aspect, embodiments relate to a method for facilitating manufacturing. The method includes retrieving at least one interactive template from a server, wherein the at least one interactive template is used to define at least one manufacturing process including at least one step; gathering data related the performance of the at least one step of the at least one manufacturing process in substantially real time; and converting the gathered data into manufacturing results data.

In one embodiment the gathered data includes the identity of the operator performing the at least one step of the at least one manufacturing process.

In one embodiment, the method includes issuing commands altering the performance of the at least one manufacturing process in response to the gathered data or the manufacturing performance data.

In one embodiment the conversion of the gathered data into manufacturing performance data comprises grouping the gathered data according to at least one parameter, and providing those groups as manufacturing performance data. The at least one parameter may be selected from the group consisting of time period, time of day, a physical configuration of components, gathered sensor data, and data provided by an operator during execution of the process.

In one embodiment the conversion of the gathered data into manufacturing performance data includes processing the gathered data to display individual operator performance.

In yet another aspect, embodiments relate to a method for analyzing manufacturing. The method includes gathering data related to the performance of at least one manufacturing process; classifying the gathered data into at least one classification; distributing the gathered data to at least one database selected from a plurality of databases, wherein the selection of the at least one database is dependent on the at least one classification; querying, using an analytic module, at least one instance of data from the at least one database; and converting the at least one instance of queried data into manufacturing results data.

In one embodiment gathering data related to performance of at least one manufacturing process includes gathering data related to performance of multiple manufacturing processes. The multiple manufacturing processes may be multiple versions of a single manufacturing process. The method may further include displaying the differences between the multiple versions of the single manufacturing process.

In one embodiment, querying the at least one instance of data includes querying at least one instance of data from multiple database.

In one embodiment, the at least one queried database is chosen based on the query.

In yet another aspect, embodiments relate to a system for facilitating manufacturing. The system includes a network-connected storage containing a master database relating to at least one process performed by at least one operator at a facility; a local server located at the facility containing a copy of the master database so that the at least one process may be performed by the at least one operator at the facility during a first time period in which the network-connected storage is not accessible, wherein the local server is configured to store data related to the performance of the at least one process during the first time period in which the network-connected storage is not accessible, and communicate the data related to the performance of the at least one process to the network-connected storage during a second time period in which the network-connected storage is accessible.

In yet another aspect, embodiments relate to a hierarchical system for facilitating manufacturing. The system includes at least one piece of machinery located in a first hierarchy layer and configured to perform at least one process, wherein the at least one process includes at least one step; at least one at least one processing device located in a second hierarchy layer and in operable communication with the at least one piece of machinery and configured to gather data related to the performance of the at least one process, wherein the at least one processing device is configurable to be in operable communication with at least one other piece of machinery based on the at least one other piece of machinery's location in the first hierarchy layer and the at least one processing device's location in the second hierarchy layer; and a plurality of user interfaces associated with the at least one piece of machinery, wherein at least two of the plurality of user interfaces are synchronized to display a same step of the manufacturing process simultaneously.

In one embodiment, the at least one processing device is configured to communicate data related to the performance of the at least one process to a network-connected storage.

In one embodiment, the at least one processing device maintains a state associated with the performance of the at least one process, wherein the plurality of user interfaces utilize the maintained state and changes to the maintained state are reflected in the plurality of user interfaces.

In yet another aspect, embodiments relate to a method for facilitating a manufacturing process. The method includes providing a user interface or enabling at least one operator to input instructions regarding a process to be performed in a workspace, wherein the process may be defined by an interactive template that is readily modifiable so the at least one operator can modify the at least one process; gathering, via at least one sensor device, data regarding a physical environment of the workspace in which the process is to be performed; communicating the data regarding the physical environment of the workspace to a processing device; and identifying, via the processing device, at least one characteristic of the physical environment of the workspace so that the process can be performed in the workspace.

In one embodiment, the user interface, the sensor device, and the processing device are contained in the same physical package.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Various embodiments will now be described, by way of example, with reference to the accompanying drawings, in which.

In the drawings, like reference characters generally refer to corresponding parts throughout the different views. The drawings are not necessarily to scale, emphasis instead being placed on the principles and concepts of operation.

DETAILED DESCRIPTION

Figure 1:
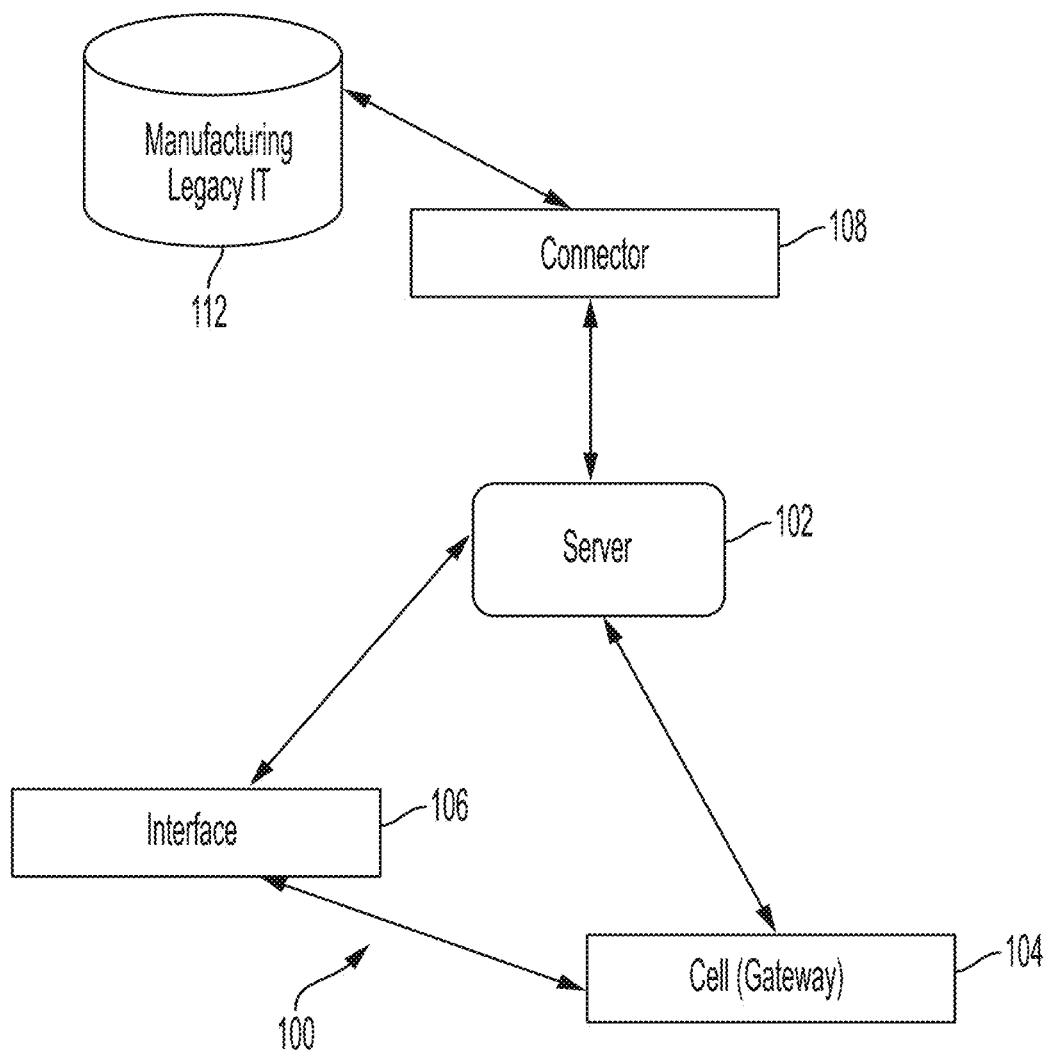
FIG. 1 illustrates a manufacturing system in accordance with one embodiment.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In the context of the present application, the terms "operator" and "user" may be used interchangeably. These terms may refer to a person within a facility who designs and/or performs some procedure. Moreover, the term "operator" may refer to a single operator or multiple operators.

Features of the present invention relate generally to a system of components that increases the flexibility of manufacturing systems while providing new tools and capabilities. These embodiments deliver a web-based, networked manufacturing platform that enables companies to automate, instrument, and analyze production environments, and allows users to easily create standard work processes and deploy them to production lines.

Embodiments of the system allow for the integration of standard automation equipment such as PLCs, sensors, and displays to control manufacturing operations and processes. Built to support manufacturing, a server backend logs all operations in the context of production lines and enables rich user interfaces with rich analytics. The Augmented Manufacturing system can be deployed on existing IT infrastructure or on network-based servers.

In overview, an operator defines a process, such as a process for the manufacturing of a product, using templates that may be edited graphically. Each process includes a set of steps that a user must perform in order to accomplish the process. Each step in the process may be associated with one or more pieces of machinery on the floor to achieve the execution of the process, either in advance or at execution time. Each step may also provide various forms of instruction, monitoring, and feedback to aid the user of the associated machinery in performing the process. Data may be collected regarding the user's performance, analyzed, and used to inform the operator who may in turn edit the process with the goal of improving its execution. Once defined, the process is effectively an "app" or application that is executed on the manufacturing "operating system" that is provided by various embodiments of the present invention.

These manufacturing applications intrinsically address the issue of instrumentation in the creation of the process, resulting in application with a graphical user interface that can span multiple interfaces (tablet, mobile, projected, HMD, etc) simultaneously and adaptively. The execution of the process itself is monitored and measured because the user interface is implemented in a web browser, providing usage statistics, etc. The accompanying analytics system permits the variables in a process step (time spent, process triggers, etc) to be reviewed and analyzed during and after execution. The application itself offers flow control based on triggers, that are created without requiring traditional programming.

FIG. 1 depicts the overall architecture of a system 100 for facilitating manufacturing in accordance with one embodiment of the invention. The system 100 includes three components.

The server 102 may be an on-premise or off-premise network-based server (which may be implemented internally as a collection of individual servers which present a single unified interface) which manages manufacturing processes, user interfaces, data collection stations, data analysis and mining, and system users (i.e. manufacturing engineers, managers, and line operators). This server 102 can interact with existing IT infrastructure to collect data from computers, import/export current orders, update supply chain data, etc. via connector(s) 108 Users may log into this server 102 via the web to design processes, view the current state of factory operations, and view and design analytics.

A cell (gateway) 104 collects information from the factory floor and sends it to the server 102. In various embodiments it is implemented, as hardware, software, or a combination thereof. A cell 104 features containerized driver execution, so that it can collect data from a variety of sources and provide it to the server 102 in connection with process execution and analytics. Containerization permits the driver to be revised during execution without taking the manufacturing process offline.

A typical installation includes a plurality of cells 104, although FIG. 1 only shows one cell 104 for simplicity's sake. The cell 104 can connect to, for example, a PLC to record output from the PLC, an RFID reader, a barcode scanner, etc. The cell 104 typically does not have a physical user interface, although various embodiments of a cell 104 may have, e.g., an embedded server that offers a web-based interface accessible by a web browser. The cell 104 can be implemented as a piece of hardware that physically connects to machinery to actively or passively collect information, or as a software program that provides an interface between commonly found machine network interfaces and server 102. The cells 104 may connect to the server 102 and various other computing devices via any type of hardwired or wireless connection (e.g., Ethernet, 802.11x, Bluetooth, etc.).

The interface 106 may be any type of graphical user interface device with which an operator interacts. These interfaces may be implemented as touchscreen computers, digital tablets, interactive projector-camera systems, or head-mounted displays (HMDs). Operators can log in and log out using these interfaces 104, view standard work procedures and instructions, call for maintenance, review factory-floor machine configuration settings, and report information through forms, among other capabilities. The design and functions offered to operators may be created by manufacturing engineers interacting with software running on the server 102. Interfaces 106 may be used as mobile devices on the floor by managers, quality control personnel, or other employees who do not work at a specific station or location.

Connector 108 is a device (such as a computer) that runs connectors of different types (SQL, HTTP, etc.) to retrieve data from existing IT systems 112 and provide that data to the server 102 and in turn to an operator via an interface device 106 (tablet, etc.). Data communications through the connector 108 may be bidirectional, using the connector 108 to report data collected by server 102 and the other components of the present system back to the legacy IT systems 112. The interface between the inventive system and the legacy system provided by the connector 108 enables analytics using legacy data and manufacturing results data captured from the operation of the system. Embodiments of the connector 108 may act as a standard interface server (e.g., OPC-UA, ERP) to allow for integration of the connector 108 into existing plant-floor infrastructure.

In one embodiment, the functionality of the various interfaces discussed herein (including but not limited to those offering process editing, process execution, and process analytics) is offered through an implementation using web technologies such as HTML5. This permits the interfaces to be used across a variety of devices supporting a web browser environment and also allows for the easy integration of various types of media in a standard fashion.

Figure 2A:
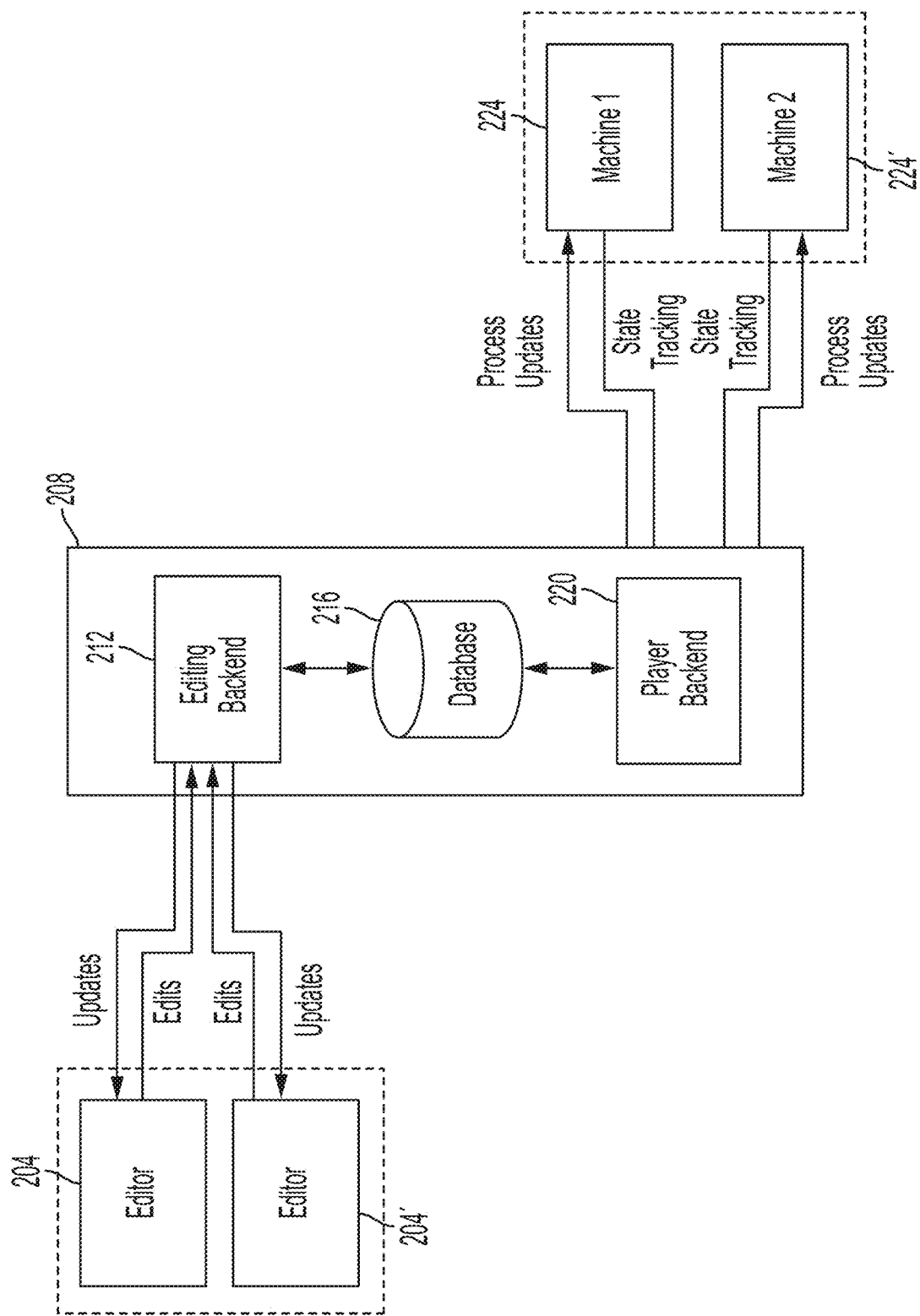
FIG. 2A illustrates a distributed process editing and deployment system in accordance with one embodiment.

FIG. 2A depicts one example of an architecture of a system for process deployment and process editing. Multiple editors (two are illustrated—204, 204') may edit the same process concurrently from different locations in real time. This system may receive new processes and edits to existing processes from one or more users, and may include: a factory server 208 with an editing backend 212, a database 216, and a player backend 220; and one or more machines 224, 224' located on a factory floor for executing the process, for example.

Editors 204, 204' may access and edit processes via an interactive template presented on a user interface. The user interface may be displayed on, for example, a PC, laptop, tablet, or a smartphone.

The editing backend 212 may accept changes from one editor 204 and provide the updated version of the process to the other editor(s) 204' substantially in real-time. These updates allow all editors 204 to view the same version of the process as it is being edited. In the event that multiple editors 204 modify the same data or process step at the same time (e.g., if network latency caused one editor 204 not to see another's edits prior to accepting a new edit), then the editing backend 212 may apply a last-write-wins rule to resolve the conflict.

The player backend 220 may be in communication with the database 216 and may monitor the database 216 for updates to one or more process(es). When updates are identified, the player backend 220 may in turn send the updates out to the appropriate machines on the factory floor to implement the modified process. These machines 224, 224' may return information describing the state of the machine on the factory floor, and the player backend may save that machine state information to the database 216.

This process-centric approach allows for the automated collection of information on the activities and behaviors of machines and operators in a manufacturing setting. Currently collection of such information is often manual, laborious and error prone. Embodiments of the present invention also provide a high degree of granularity in the collecting data at the level of individual steps in a manufacturing process. This data may be analyzed to allow production engineers to tune a production process and reduce its cost.

Figure 2B:
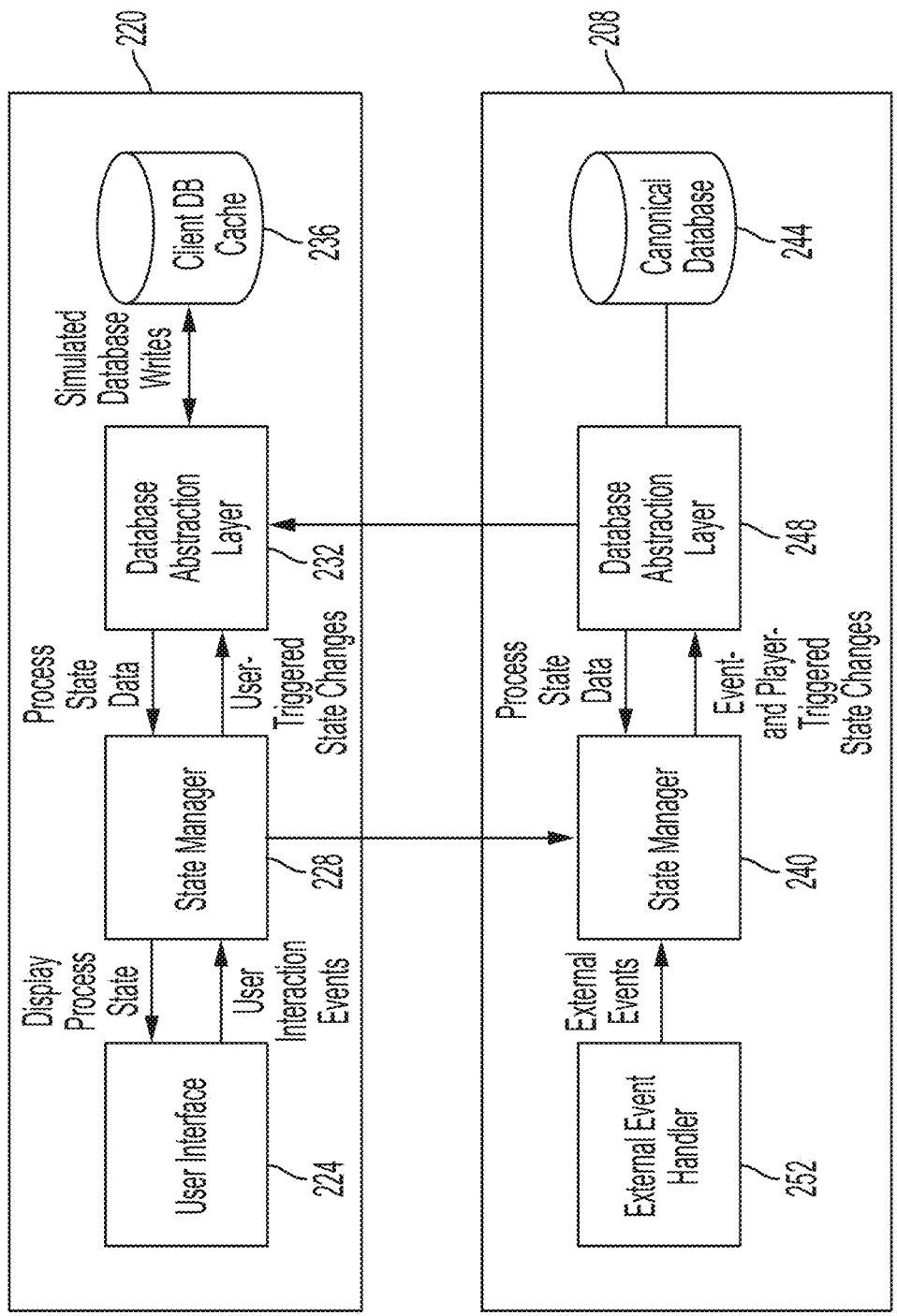
FIG. 2B presents one embodiment of a process execution system.

FIG. 2B presents an embodiment of the player backend 220 in more detail. The backend 220 serves as the operator's interface to the executing process as the operator performs the various steps of the process using the machines 224. In this embodiment, the player backend 220 is in a device that is separate from the factory server 208, such as a tablet, PC, laptop, cell phone, etc.

In this embodiment, the backend 220 includes a user interface 224, a state manager 228, and a database abstraction layer 232 that serves as the backend's interface 220 to a client cache 236. The state manager 228 on the backend 220 is in communication with the state manager 240 on the factory server 208, which may be co-located with the backend 220 or situated in a different location.

As the state of the backend 220 changes through the performance of the specified process, the changes in state are tracked by the backend state manager 228 and stored in the cache 236 through the data base abstraction layer 232. Changes in the state may be displayed to the operator via the user interface 224, as well as directions, instructions, graphics, etc., intended to instruct the operator through the performance of the process. The user interface 224 also permits the operator to provide input to the system, e.g., confirming the completion of various steps in the process.

Changes in the state of the backend 220 are also communicated to the factory server 208, whose state manager 240 similarly stores those changes in its canonical database 244 via its own abstraction layer 248.

The existence of the cache 236 permits the backend 220 to operate while avoiding the latency inherent in communications with the factory server 208 because the backend 220 can respond to user interactions with the information in the cache 236. Transactions with the cache 236 can be later duplicated in the canonical database 244 via the factory server state manager 240 and abstraction layer 248 to ensure that operators interacting with the canonical database (e.g., by editing processes, etc.) are receiving accurate information concerning the performance of the process.

The server 208 can also effect changes to the backend 220 (e.g., the processes executing on the backend 220) by duplicating updates to the canonical database 244 and sending them to the abstraction layer 232 of the backend 220 for storage in the client cache 236.

As mentioned previously, in various embodiments editors may interact with interactive templates to create and/or modify a process, such as a manufacturing process. These templates may be similar in appearance to a flowchart or other process diagram that may be created using traditional presentation software. However, these templates allow operators to readily view and modify processes by, e.g., embedding logical tests and conditions in the graphical depictions of a process.

This permits an operator to, in real time, take an existing manufacturing application, edit the application, and deploy the revised application with integrated data collection facilities without requiring traditional programming. By way of contrast, current approaches to MES have a rigid configuration that is not changeable by the operator, with limited data collection and interfaces.

Figure 3A:
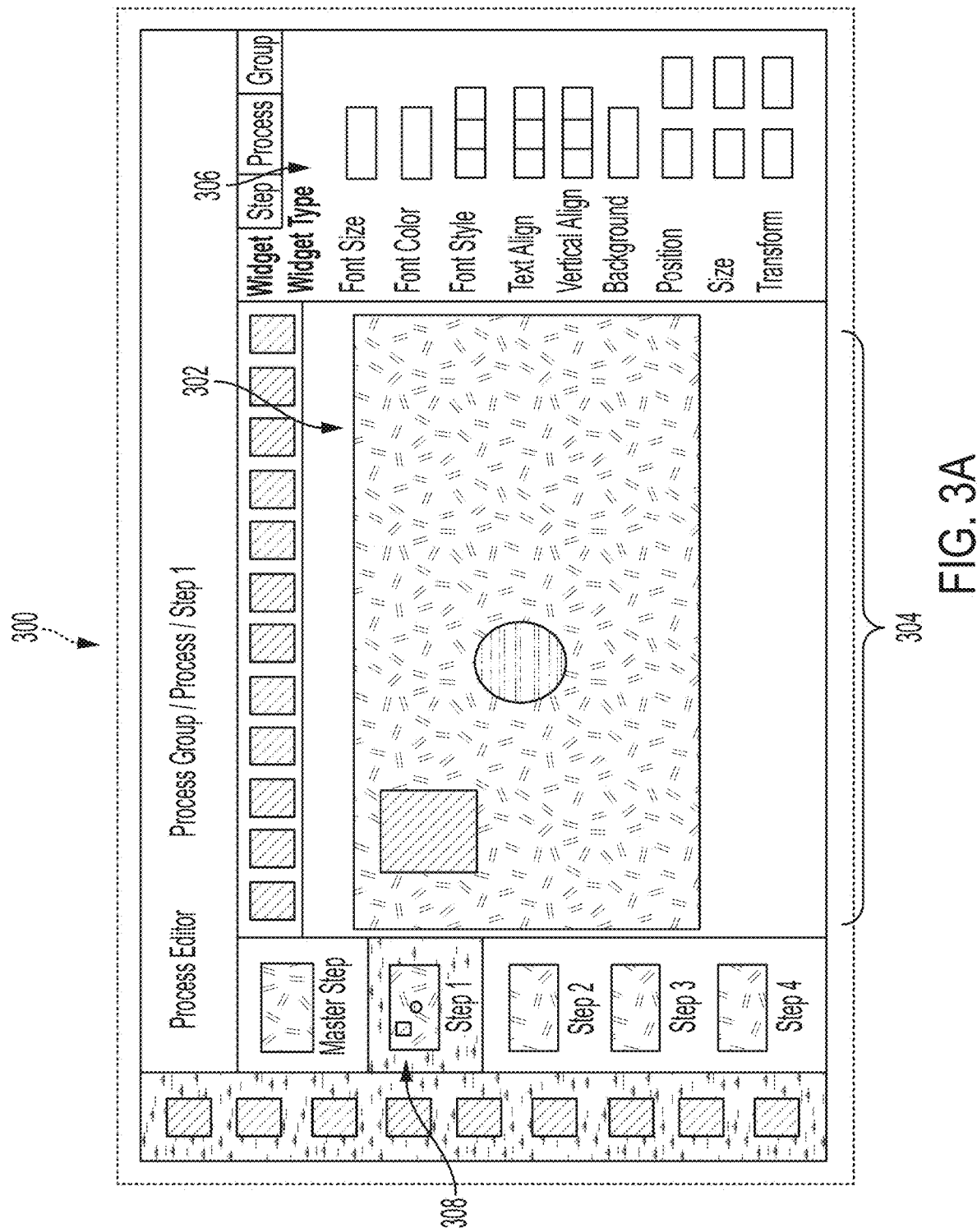
FIG. 3A presents an exemplary interface for editing processes in accordance with one embodiment.

FIG. 3A presents an example of a process template being edited. This editor 300 may be presented to an operator via an internet connection and viewed on an operator user interface such as one implemented on a PC, laptop, tablet, smartphone, smartwatch, or the like. This editor 300 may be augmented reality-based and presented as interactive imagery projected by a projection device on a surface (e.g., using a SPROUT 3D AIO desktop computer, available from Hewlett-Packard Company of Palo Alto, Calif.). As discussed above, the editor 300 may be implemented using web technologies such as HTML5, permitting the ready use of the editor 300 and related interfaces across a variety of devices supporting a web browser and permitting the incorporation of various media.

The editor 300 includes a process design canvas 302 in which an operator may implement a process by "dragging and dropping" a variety of widgets, text, 3D data, CAD databases, and other types of indicia. As shown, an operator may specify instructions for a particular step in a process in the form of text and arrows, such as an instruction to place an object in the center of a highlighted region. The canvas 302 may also include various predetermined criteria requiring, e.g., certain operator information, credentials, etc., to be satisfied to prevent the unauthorized modification of processes.

In one embodiment the bottom of the editor 300 includes a widget and navigation panel 304. Widgets may be any of a variety of graphical, dynamic, or interactive indicia that can be placed in the editor portion 300 of the interface. Types of widgets that can be added to a process include arbitrary static text; dynamic text (e.g., a text element that automatically displays the description of the current (displayed) step); buttons operable by an operator to change the state of the process (e.g., go to the previous or next step, bring up a contextual menu, or signal an alert); shapes such as circles, squares, arrows, projection targets, etc.; images; videos; timers; data input elements such as checkboxes, radio buttons, text and numeric entry fields, drop-down selectors, and other standard GUI data input elements; image capture elements (e.g., captured from on-board and/or external sensor devices); video conferencing portals; indicators such as gauges, lights, and other indicators that respond to and or reflect data input; and visualizations or graphs resulting from the analysis of process data (e.g., a running graph of average cycle time, the number of process completions by the operator, contextual data about the current state of the process).

The aforementioned widgets may be parameterized by size, location, rotation, color, and other attributes. As discussed below, the parameters of a widget may change in response to values internal to the process, such as process state or variable values, or in response to data values collected from the work floor. The operator may edit the canvas (i.e., the process) by "dragging and dropping" widgets to their desired positions. Additionally, the interface 300 may include a widget editing portion 306. The widget editing portion 306 may be used to, for example, change the color and/or size of particular widgets presented on the interface.

In this embodiment, on the left side of the interface, there is a step editing portion 308 outlining the different steps of a process. These steps may include "Weigh batch," "Insert batch into furnace," and "Heat batch in furnace." Therefore, an operator can click on a particular step to easily navigate between and edit each step of the process. The "weigh batch" title, etc., are labels that may be given by the user of the system instead of anything inherent to process.

Processes may have a "master" template on which a collection of widgets or other types of graphical elements may be arranged. These elements may be visible by default on every canvas associated with every step associated with the template. This is analogous to the "master" slide offered on traditional presentation software. However, while operators traditionally use such software to make static, non-instrumented, file based standard work instructions, embodiments of the present invention allow similar efforts to result in the creation of manufacturing applications with automated data collection and analytics capabilities that can instruct operators while addressing the conditional nature of most manufacturing processes.

Figure 3B:
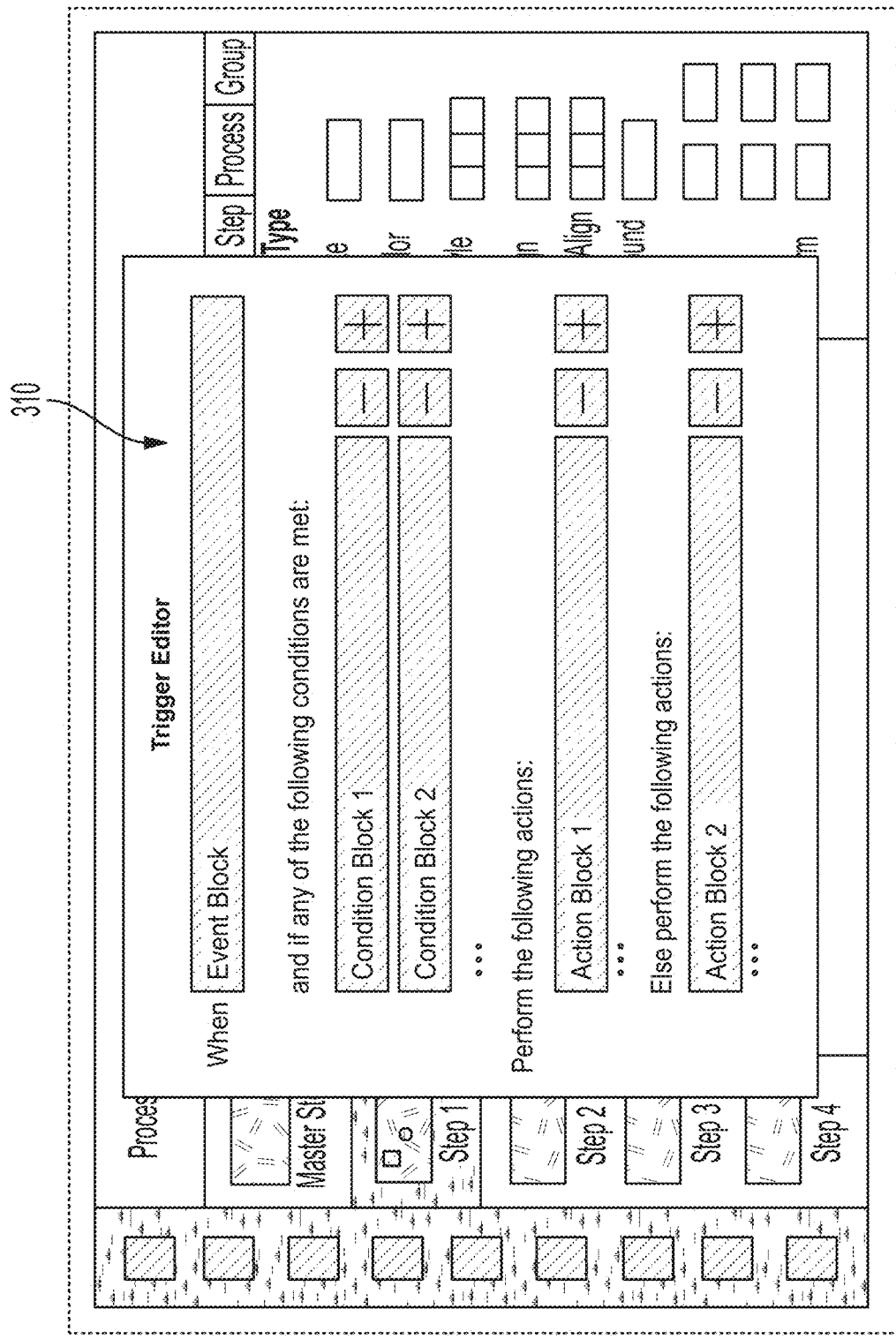
FIG. 3B presents an exemplary interface for editing triggers in accordance with one embodiment.

Operators may also define triggers to more closely control a process, and FIG. 3B presents an exemplary interface 310 for editing triggers in accordance with one embodiment. Triggers may be assigned to specific steps, the master template, or individual widgets placed on a canvas. Triggers may take the form of an if/then or an if/then/else rule. That is, one or more predicates based on event(s) or value(s) are evaluated and, if true, then a process-related action or actions may take place. An optional fallback step may be specified if the condition isn't met. An example trigger that illustrates the mechanism could be: 1. IF [temperature sensor at this station] EMITS [temperature-measured] AND [temperature-measured. Celsius>25] 2. THEN [goto=step "over-temperature"]. This permits the handling of the interactive nature of manufacturing applications without requiring the operator to undertake traditional programming tasks.

In this example, the first part (1) is the predicate which must evaluate to true, and the second part (2) is the action that will occur. The first component of the predicate, [temperature sensor at this station] selects among the different devices that emit messages corresponding to events. The process itself can emit messages, for example, if an internal timer expires. The second component of the predicate [temperature-measured] indicates the type of message that was emitted, and the third component, [temperature-measured.celsius>25] is an additional predicate over data that is part of the emitted event. The second part of the trigger, the then part, describes the action that should be taken. In this example, the action "goto-step" will be taken, parameterized with "over-temperature," the name of the step to which the process should transition.

Triggers may be based on values or states that are internal to the process itself, such as variable values, timers, the results of mathematical computations, etc., or values that are external to the process, such as sensor values, data retrieved from a data store, etc.

This example is merely one type of trigger that may be implemented in a process. Widgets may be used to trigger a variety of other types of actions such as going to the previous or next step; going to an arbitrary step; completing, restarting, or aborting a process; logging out; invoking a contextual menu or navigating its contents; filling a data entry field; storing the contents of an event's data in a process variable for storage or use in the process; triggering an alert condition; triggering an image capture, or the like.

Widgets may also contain anti-circumvention mechanisms implemented as triggers or otherwise to prevent operators from intentionally or inadvertently manipulating collected data. For example, without such mechanisms, an operator could artificially influence their average cycle time or other collected statistics by, e.g., pressing the "next" button repeatedly. One such anti-circumvention mechanism to prevent this kind of manipulation is to disable the "next" button for a fraction of the expected cycle time.

Process designs can be versioned (archived). When a process is "published," it is made non-editable and stored as a version. Any further changes to a published process may be made instead to a copy of the published process which may also be published when the changes are complete. This ensures that any data captured during the execution of a process can later be associated with the process version in use at the time of execution.

The versioning of processes also enables "AB testing" and other forms of process optimization. When different versions are published and performed, data related to performance may be gathered and analyzed to determine the effects of various changes to a process. In some embodiments, processes achieve a similar effect by permitting some of their steps to be performed in random or varying order.

Figure 4B:
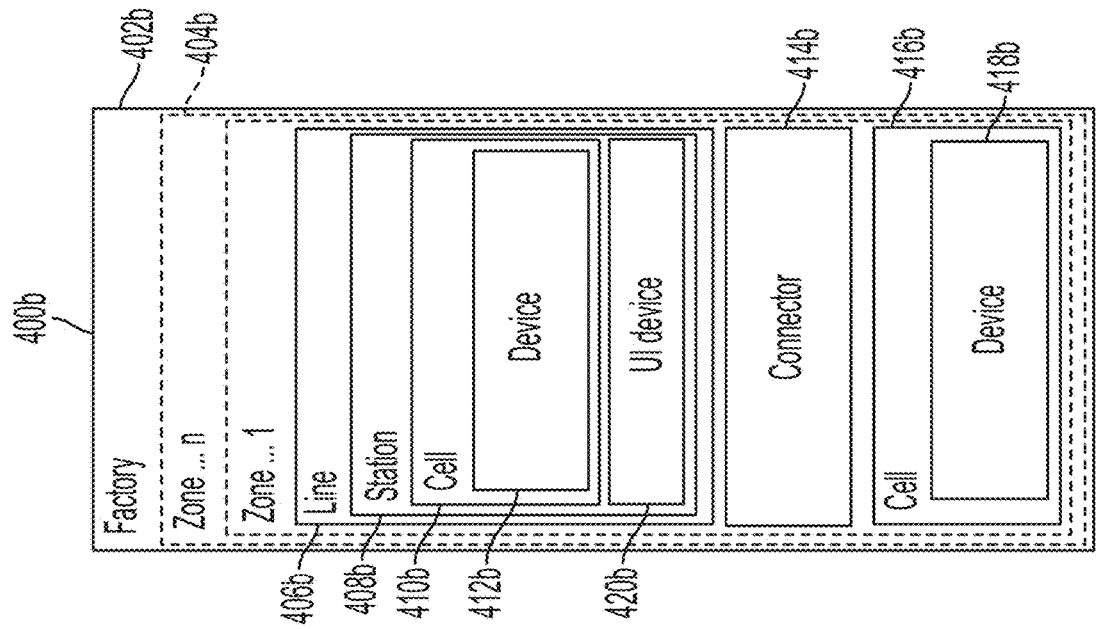
FIGS. 4A-B illustrate hierarchical manufacturing operating systems in accordance with two embodiments.
Figure 4A:
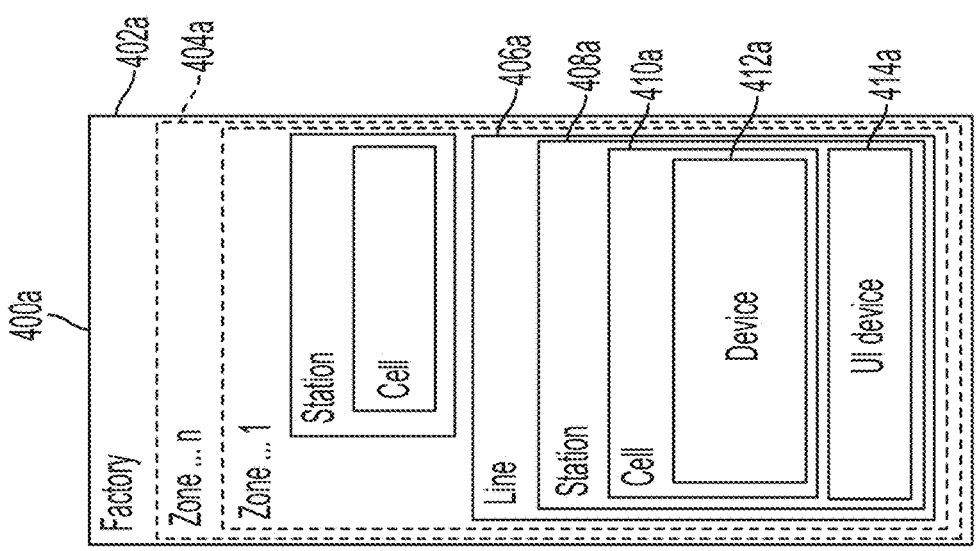

Embodiments of the present invention effectively organize the elements in a process in a hierarchy to allow for more efficient organization and re-organization when required. FIGS. 4A and 4B depict exemplary hierarchy configurations 400a and 400b, respectively. System hierarchy 400a includes, as the top level of the hierarchy, a factory 402a (meaning the physical facility where operations (manufacturing or otherwise) take place). Zones 404a and lines 406a are conceptual grouping units that can be used to organize operations according to the operator's needs. The terms "line" and "zone" can be chosen by the end user, and are merely exemplary terms here. For example, a factory can be divided into zones based on, e.g., geography, and equipment in a zone can in turn be organized into lines based on, e.g., the products manufactured by those pieces of equipment.

A station 408a is a grouping unit that may map to the equipment (or pieces of equipment) used by a single operator. Stations typically have at most one operator logged into them at once, and typically have at most one process running at a time. The station 408a may include a cell 410a that includes a device 412a.

As discussed previously, the cell 410a may be hardware, software, or a combination thereof that connects to devices 421a, monitors their communications and other signals, and translates the monitored information into events that are provided to a server (such as the server 102 of FIG. 1). Cells 410a are associated with stations 408a and can be connected to multiple devices 412a.

A device 412a is a piece of manufacturing hardware that the system 400a interfaces with. Example devices 412a include PLCs, environmental sensors, computerized numerical control (CNC) machines, barcode and RFID readers, etc.—essentially any piece of manufacturing equipment that can be monitored, connected to a cell 410a, or otherwise integrated with some information technology via, e.g., a database connector.

All devices 412a (e.g., machinery) associated with a station 408a are synchronized with respect to the process currently running for that station 408a. For example, when a process comprised of many steps is executing on a station 408a, all devices 412a associated with the station 408a will be on the same step in the process. It is noted that each devices 412a may display different information for the same step, as is appropriate. For example, separate left-side and right-side displays may show material relevant to their portion of the step. System 400a also includes a UI device 414a. This may be an operator interface that displays a GUI for a process as it executes.

The hierarchy displayed in FIG. 4B is similar to that discussed above in connection with FIG. 4A. The common elements are not repeated here, but it is worth noting that in system 400b the line 406b and the cell 416b are at the same hierarchical level. Connector 414b connects cell 416b (that corresponds to a device 418b) with the factory 402b. In other words, the cell 416b and the device 418b are not required to be inside the station 408b, and in fact may be in disparate physical locations.

Figure 5:
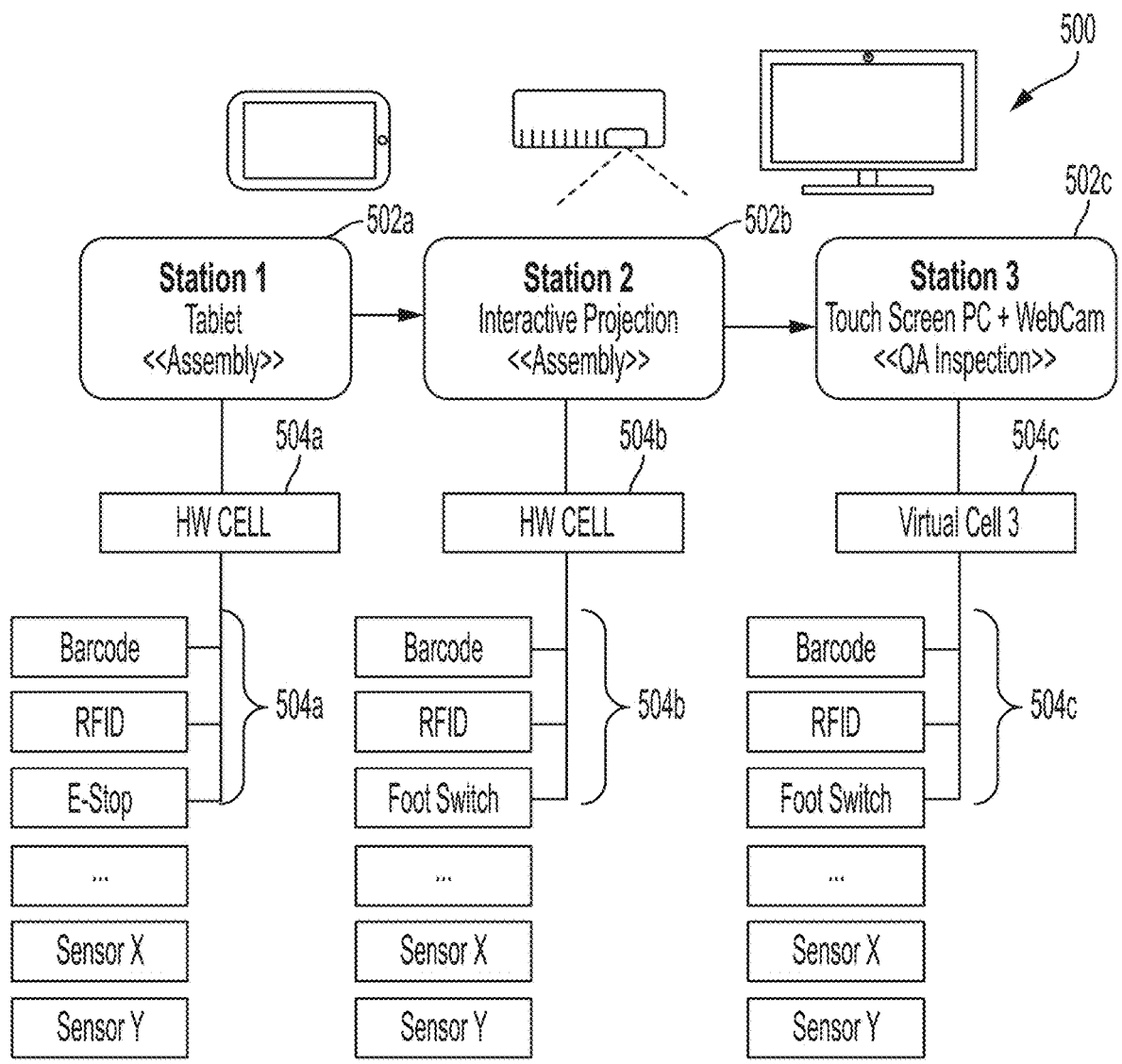
FIG. 5 presents exemplary stations in accordance with multiple embodiments.

FIG. 5 depicts an exemplary production line 500 organized in accordance with the principles of the hierarchy discussed in FIG. 4. Each station 502a, 502b, and 502c typically has at most one operator logged into it, and is in operable communication with its own cell 504a, 504b, and 504c, respectively. The same operator can be logged into several stations simultaneously, however. The cells may be implemented as hardware, software, or a combination of both, for example, as necessary to interface with the appropriate device.

Hardware components 506a, 506b, and 506c that are associated with the same station (each of 502a, 502b, and 502c respectively) are treated as a unit. For example, in a station comprising a cell 504a and a tablet interface 502a, the data captured by the cell 504a—which is itself connected to factory floor equipment and sensor(s) 506a—is transmitted to the server (such as server 102) and also used to change what is displayed on the user interface on the tablet 502a at that station.

Figure 6:
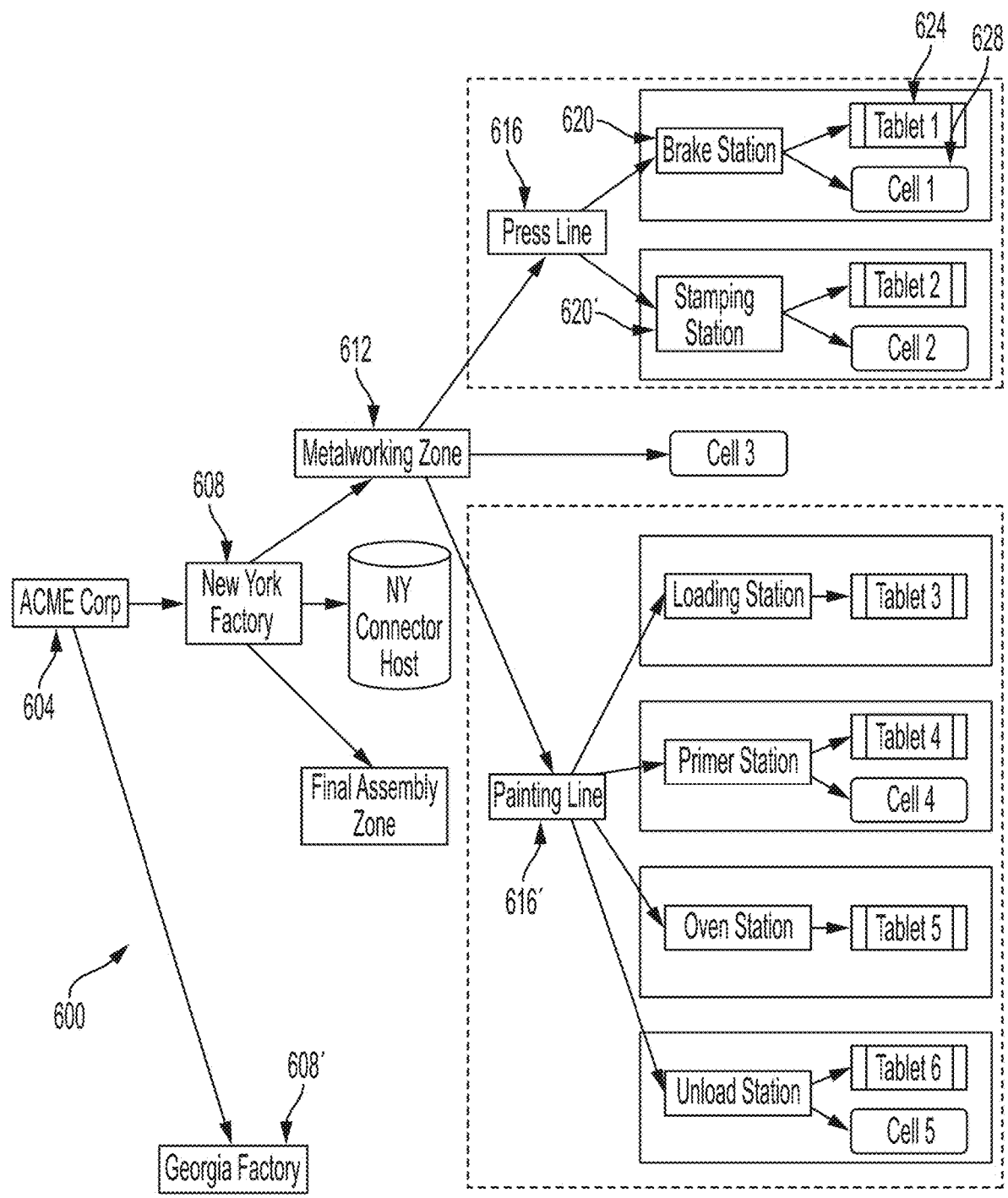
FIG. 6 illustrates one example of a hierarchical manufacturing system in accordance with FIGS. 4A-B.

FIG. 6 depicts a chart 600 representing one example of a manufacturing facility organized according to the system hierarchy 400a of FIG. 4A. As can be seen, the ACME Corporation 604 has two factories, New York 608 and Georgia 608'.

New York 608 has a metalworking zone 612 that is depicted as instrumented and equipped as discussed herein. The press line 616 has a brake station 620 and a stamping station 620'. Each station 620 in turn has a table 624 and a cell 628. The same discussion applies to the painting line 616'.

The configurations of the systems in FIGS. 4A-6 provide a number of advantages for manufacturing operations and the like. For one, the architecture enables granular comparison of operational manufacturing data across different production lines and sites. Additionally, the hierarchical configuration allows operators to dynamically configure which machinery (i.e., devices) and sensors correspond to each other and other layers in the hierarchy. This also facilitates reconfiguring and reprogramming components of the system.

Figure 7A:
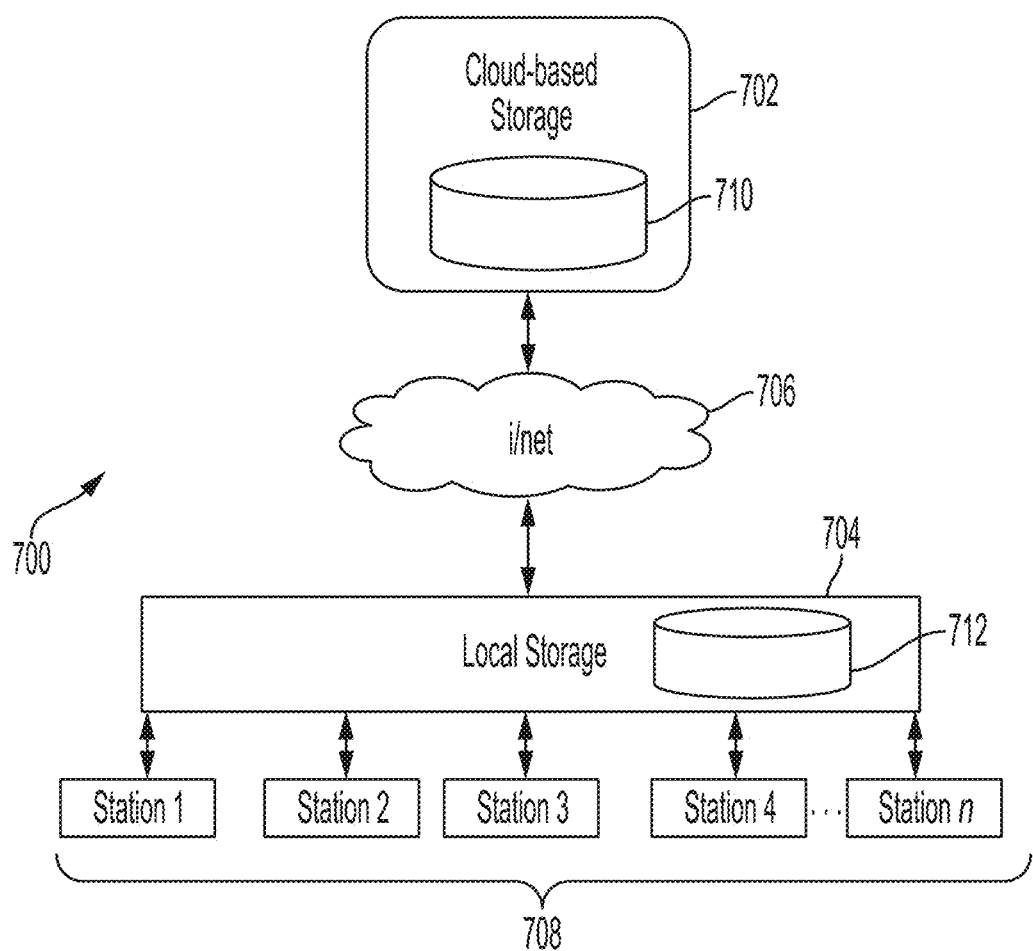
FIG. 7A illustrates a cloud-local hybrid storage configuration in accordance with one embodiment.

FIG. 7A depicts a cloud-local hybrid architecture 700 in accordance with one embodiment of the invention. This hybrid architecture may be used to provide an additional level of resiliency for the system and to minimize or at least improve issues due to latency. The architecture 700 may include a cloud-based storage 702 and in communication with a local storage 704 via an internet connection 706.

Existing systems may be heavily dependent on cloud-based storages for operation. This is not ideal, however, as this configuration may suffer from network-based latency associated with querying information from the cloud-based storage and retrieving the information from the cloud-based storage. Additionally, this type of configuration requires an internet connection that may occasionally become unavailable for a variety of reasons.

The system 700 of FIG. 7A, however, overcomes these disadvantages. For example, states of stations 708 may be stored in local storage 704 and communicated amongst each other without being required to communicate directly with the cloud-based storage 702. Therefore, operations may continue even in the event that communications through the internet connection 706 are disrupted or otherwise unavailable.

The cloud-based storage 702 may include a master database 710 containing information relating to a process performed, configured, edited, tested, etc. by an operator. The local storage 704 may include a copy 712 of the master database 710. Therefore, a process normalizing utilizing the master database 710 for data storage and retrieval may still be performed, and information regarding the performance of the process may be gathered, even during a time period in which the cloud-based storage 702 is inaccessible (e.g., due to a disabled internet connection 706). Once the cloud-based storage 702 becomes accessible again, this information may be communicated to the cloud-based storage 702 and the local database 712 and master database 710 may otherwise be synchronized, if desired.

Figure 7B:
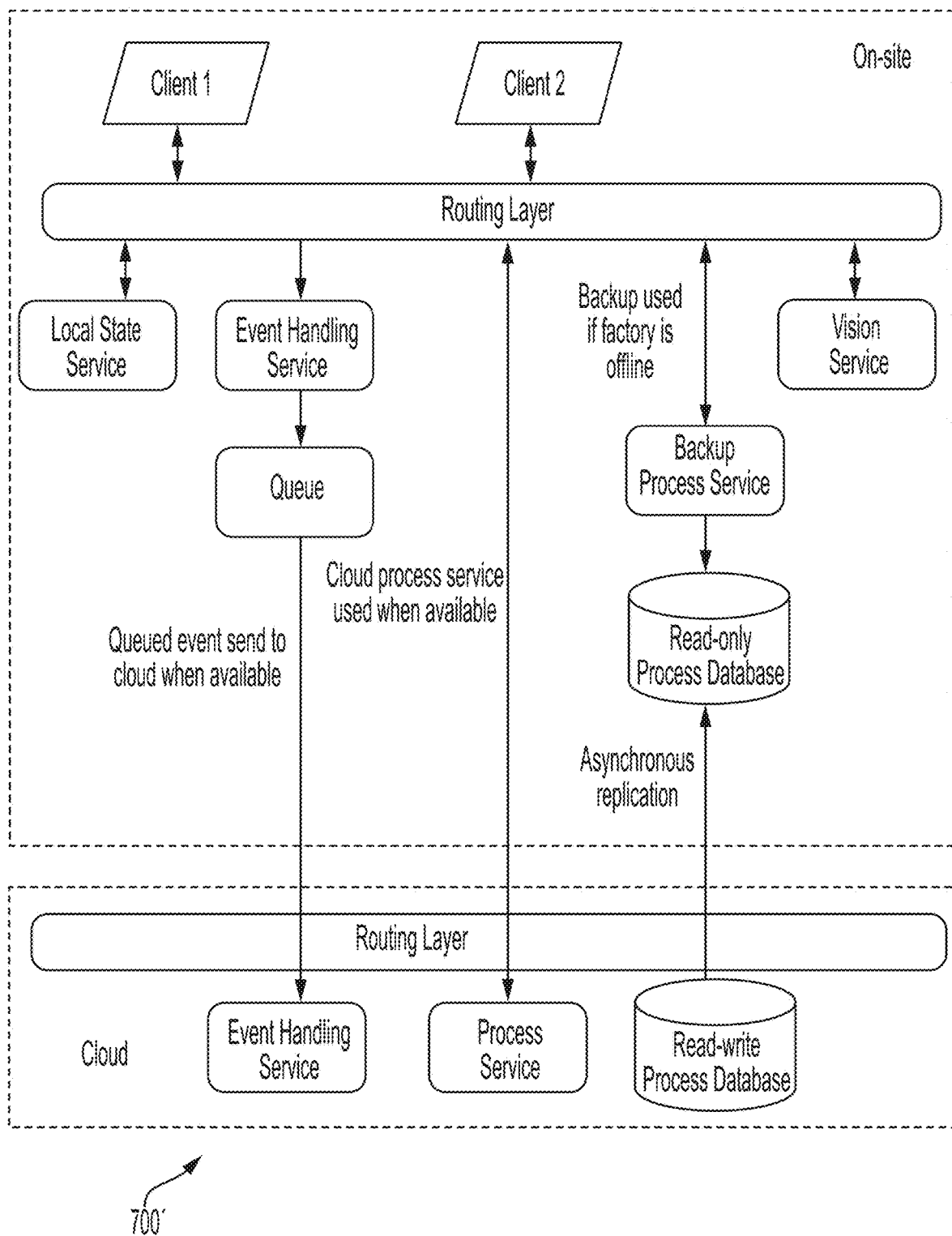
FIG. 7B illustrates a cloud-local hybrid storage configuration in accordance with another embodiment.

FIG. 7B illustrates another embodiment of cloud-local hybrid storage. It shares several elements with the embodiment of FIG. 7A. It also depicts the process service on the server side and the local backup process service and process database that is used when the server is unavailable, discussed above in connection with FIG. 2. It also depicts the synchronization of the event handling service between the cloud and the local instantiation.

Figure 8:
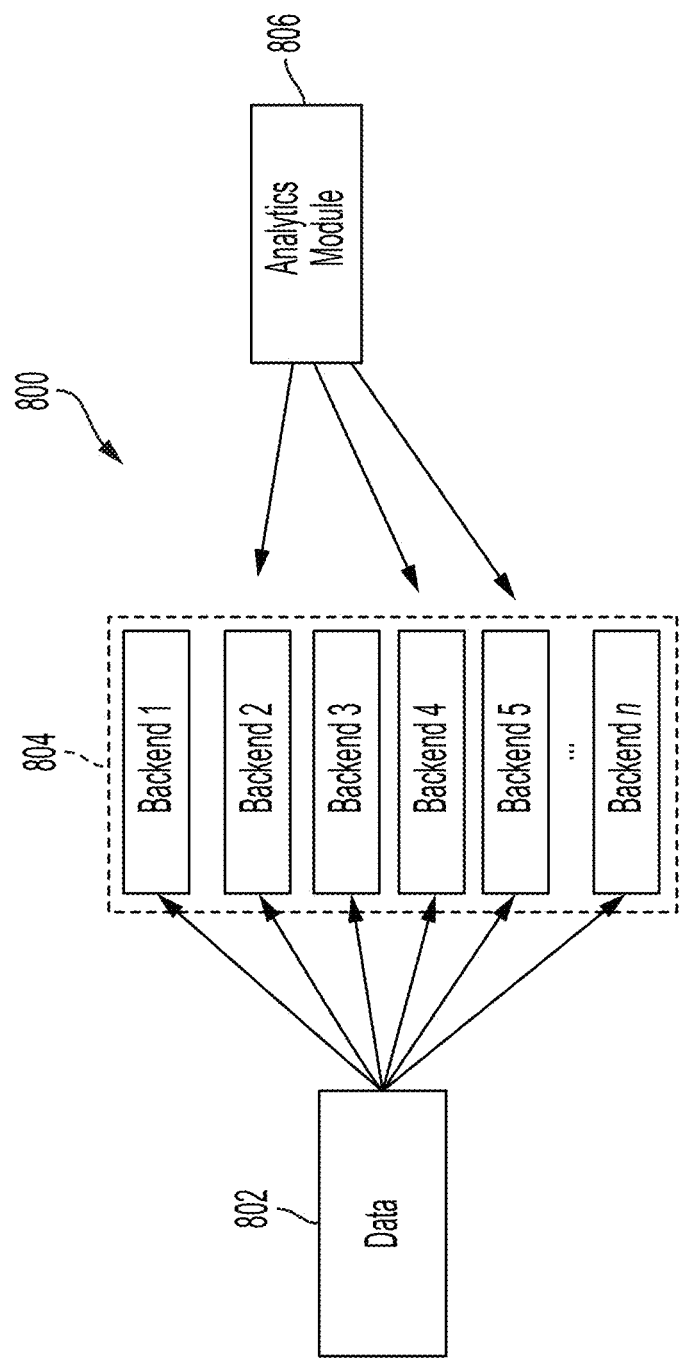
FIG. 8 illustrates an analytics system in accordance with one embodiment.

Features of the present invention also enable advanced analytic techniques for analyzing information related to process performance. FIG. 8 depicts a schematic of an analytics process 800 in accordance with one embodiment of the invention. Data 802 regarding the performance of a process may be grouped into states, i.e., data points in a process, and are meant to capture all data related to the work flow.

The gathered data 802 may be transmitted to multiple back ends 804. The particular backend receiving the data 802 may depend on the type of data 802, the volume of data 802, etc. This permits certain backends 804 to be optimized to address certain types of data 802. For example, a backend 804 may include a distributed database to process a large amount of unstructured data, while another backend 804' may utilize an SQL database to process smaller amounts of structured data, etc.

The analytics module 806 may then, for example, compile an analytic to be executed across one or multiple backends 804. For example, a received query may be parsed by the analytics module 806 and configured to run across multiple backends 804 or a specific backend 804 based on the query. This allows for, among other features, incremental changes to analytics (queries), offline processing of queries, and more efficient statistical analysis of data from various data sources.

Figure 9:
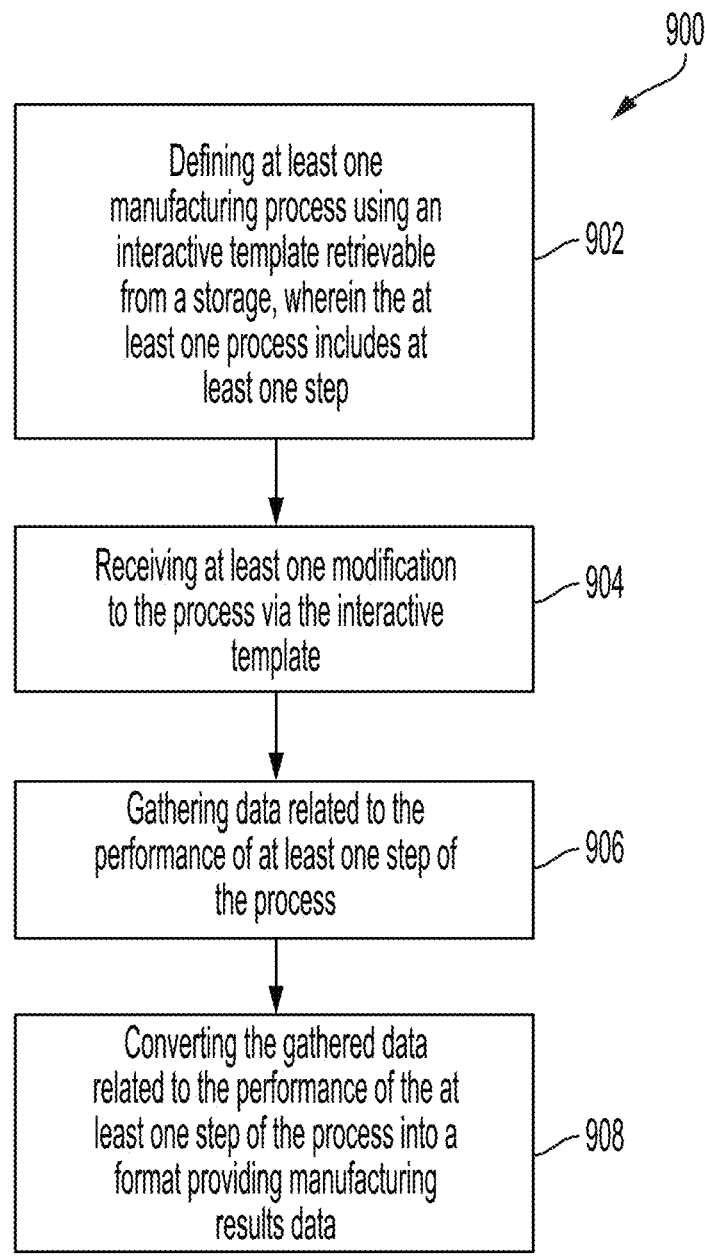
FIG. 9 depicts a flowchart of a method of operating a manufacturing system in accordance with one embodiment.

FIG. 9 depicts a flowchart of a method 900 for operating a manufacturing operating system in accordance with one embodiment. This method may be executed by least one processor capable of executing instructions encoded on a computer-readable medium Step 902 involves defining at least one manufacturing process using an interactive template retrievable from a storage wherein the at least one process includes at least one step. This manufacturing process and the included steps may relate to heating processes, cutting processes, drilling processes, welding processes, logistics-related processes, assembly-related processes, or the like. This list of manufacturing processes is not meant to be exhaustive and it is expressly contemplated that other types of manufacturing processes may be defined in accordance with the features of the invention. One of ordinary skill would recognize that appropriate non-manufacturing processes would also be suitable for use with embodiments of the present invention.

As discussed above, the at least one process may be defined via an interactive editing process using a template such as the one depicted in FIG. 3. Operators such as engineers or the like may utilize various widgets to enter instructions defining one or more steps of the process for later execution by an operator. The templates may be retrievable from a network-connected storage. This storage may be a cloud-based storage or a local storage, for example.

Step 904 involves receiving at least one modification to the process via the interactive template. As mentioned previously, the operator may interact with the template in a variety of ways to create, edit, test, or otherwise modify a process. A modification may include, e.g., a change to an operating temperature, a change to the temporal length for performing of a step, a change to the placement location of an article, or the like. This list of potential modifications to a process is not meant to be exhaustive, and it is expressly contemplated that other modifications may be made (and may depend on the particular process) in accordance with the features of the invention.

Step 906 involves gathering data related to the performance of at least one step of the process. This data may be gathered in a variety of ways such as various sensor devices surrounding, instrumenting, or otherwise in operable communication with the operator performing the step, the workpiece, the work station, an instrumented tool, etc.

Step 908 involves converting the gathered data related to the performance of the at least one step of the process into a format providing manufacturing results data. The data gathered in step 906 may be processed into a variety of data points useful for analyzing the performance of the process. For example, the gathered data may be converted into various derivatives, including but not limited to simple averages (i.e., a means(s)), weighted averages, standard deviations, etc. This information may also be presented to an operator tabularly or graphically via an interface to an operator.

Figure 10:
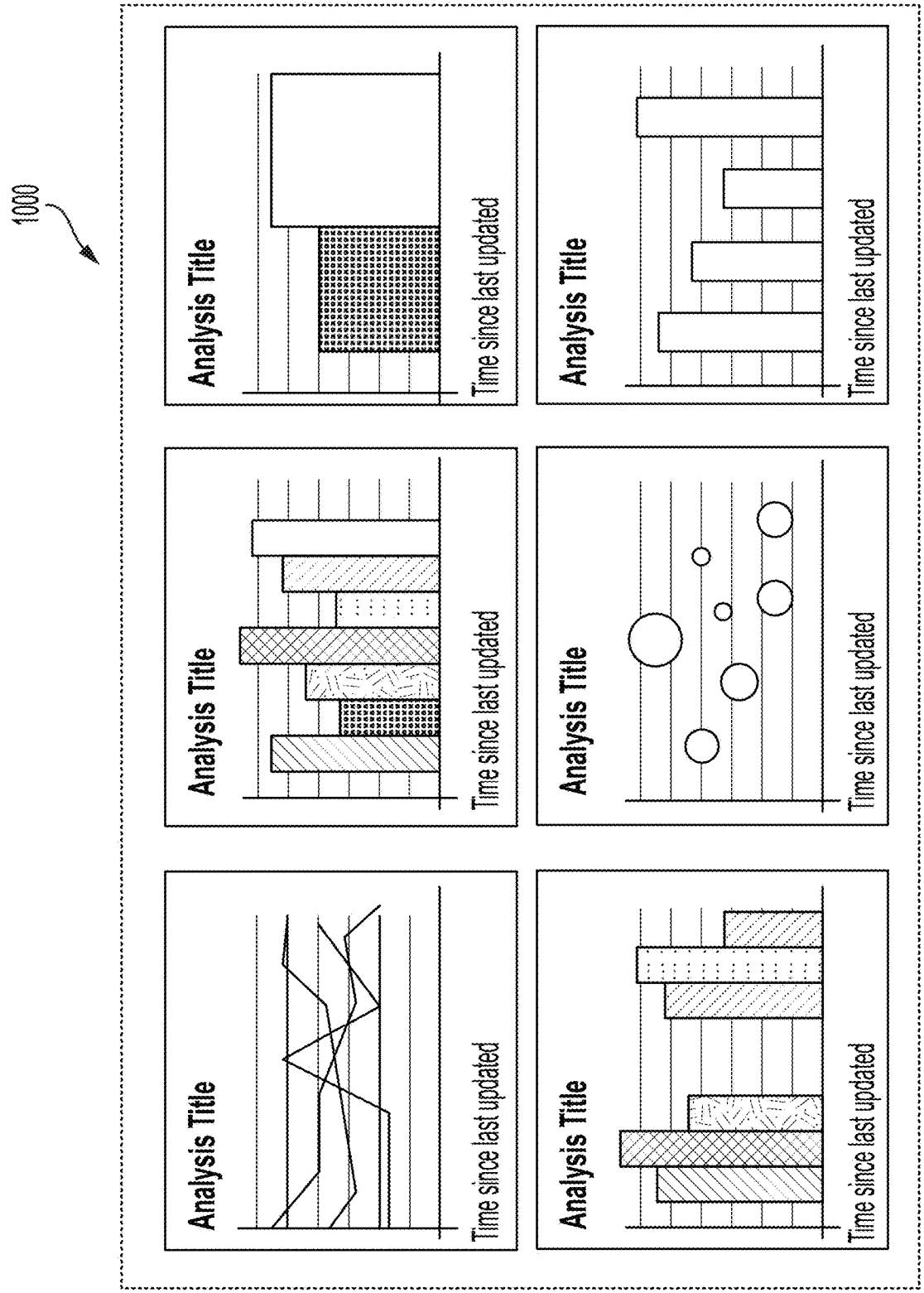
FIG. 10 depicts a dashboard including a plurality of interfaces for presenting process manufacturing results data in accordance with one embodiment.

FIG. 10 depicts an example of a dashboard 1000 with a plurality of interfaces presenting process-related data that may be gathered and generated in connection with a process like that presented in FIG. 9. As shown, this data may be presented in the form of bar graphs, line graphs, scatter plots, or other type of display that is easily readable for an operator.

Embodiments of the invention make various analytics available in connection with the execution of processes. Notable displays include return on investment in process and, as discussed above, the results of testing that vary the execution of a process to identify possible optimizations (e.g., AB testing).

Figure 11:
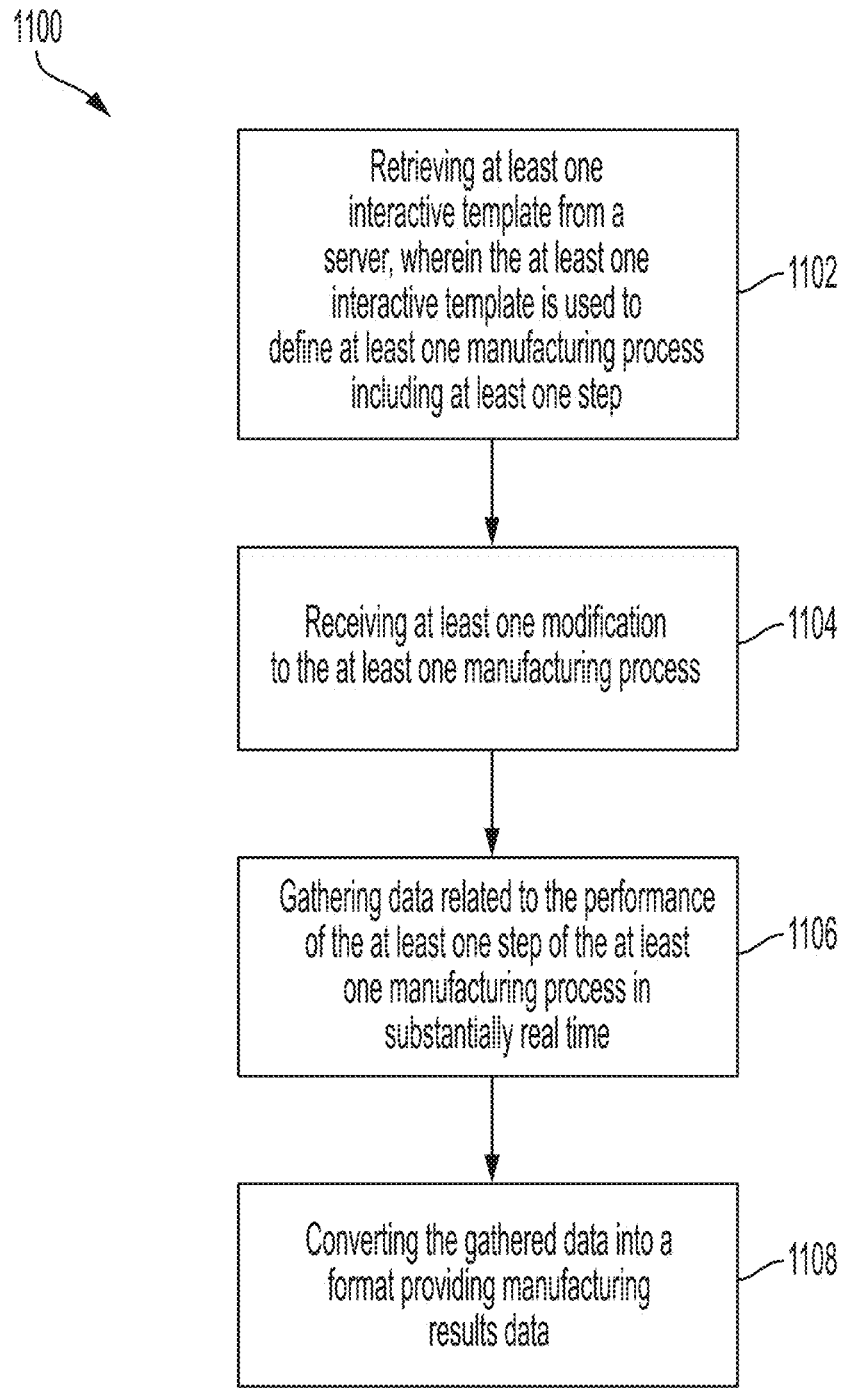
FIG. 11 depicts a flowchart of a method for facilitating manufacturing in accordance with one embodiment.

FIG. 11 depicts a flowchart of a method 1100 for facilitating manufacturing in accordance with one embodiment. This method may be performed in a manufacturing facility such as a factory or the like. Step 1102 involves retrieving at least one interactive template from a network-connected server. The at least one interactive template is used to define at least one manufacturing process including at least one step. This storage may be a cloud-based storage or a local storage, for example. Steps 1104, 1106, and 1108 are similar to steps 904, 906, and 908 of FIG. 9 and are not repeated here.

Figure 12:
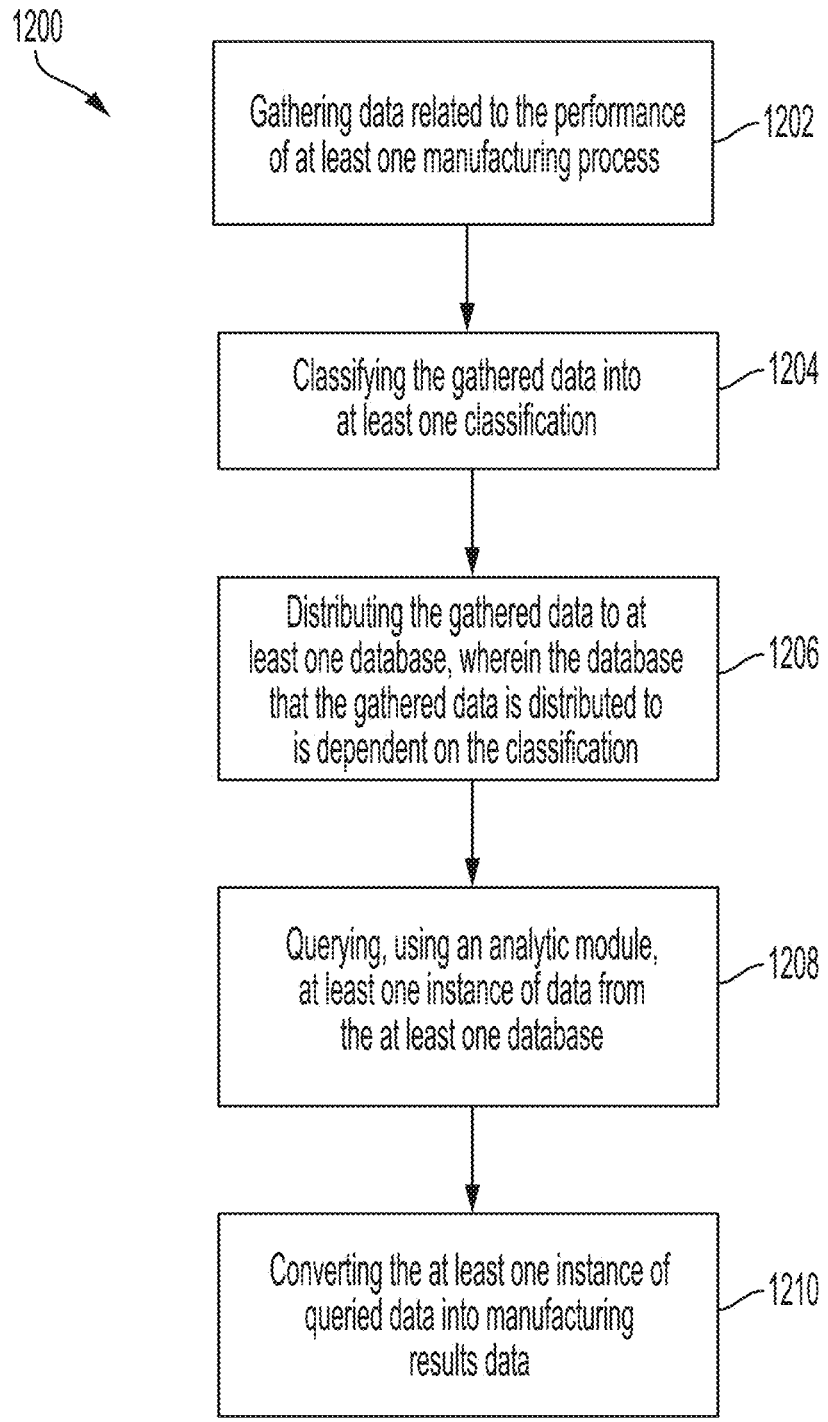
FIG. 12 depicts a flowchart of a method for analyzing manufacturing processes in accordance with one embodiment.

FIG. 12 depicts a flowchart of a method 1200 for analyzing manufacturing processes in accordance with one embodiment. Step 1202 involves gathering data related to performance of at least one manufacturing process. This step may be similar to step 906 of FIG. 9, for example.

Step 1204 involves classifying the gathered data into at least one classification. Classifications are ways of organizing data points in a process and are meant to capture all data related to a work flow.

Step 1206 involves distributing the gathered data to at least one database, wherein the database receiving the gathered data is selected based on the classification of the data. As mentioned previously, certain kinds of data are better suited for certain back ends. For example, a distributed database may be preferable for a large amount of data, and SQL database may be preferable smaller amounts of data, etc.

Step 1208 involves querying, using an analytic module, at least one instance of data from the at least one database. A query may be configured to run across multiple database or a specific database may be selected based on the query. This allows for, among other features, incremental changes to analytics (queries), offline processing of queries, and more efficient statistical analysis of data in data sources.

Step 1210 is similar to step 908 of FIG. 9 and is not repeated here.

Figure 13:
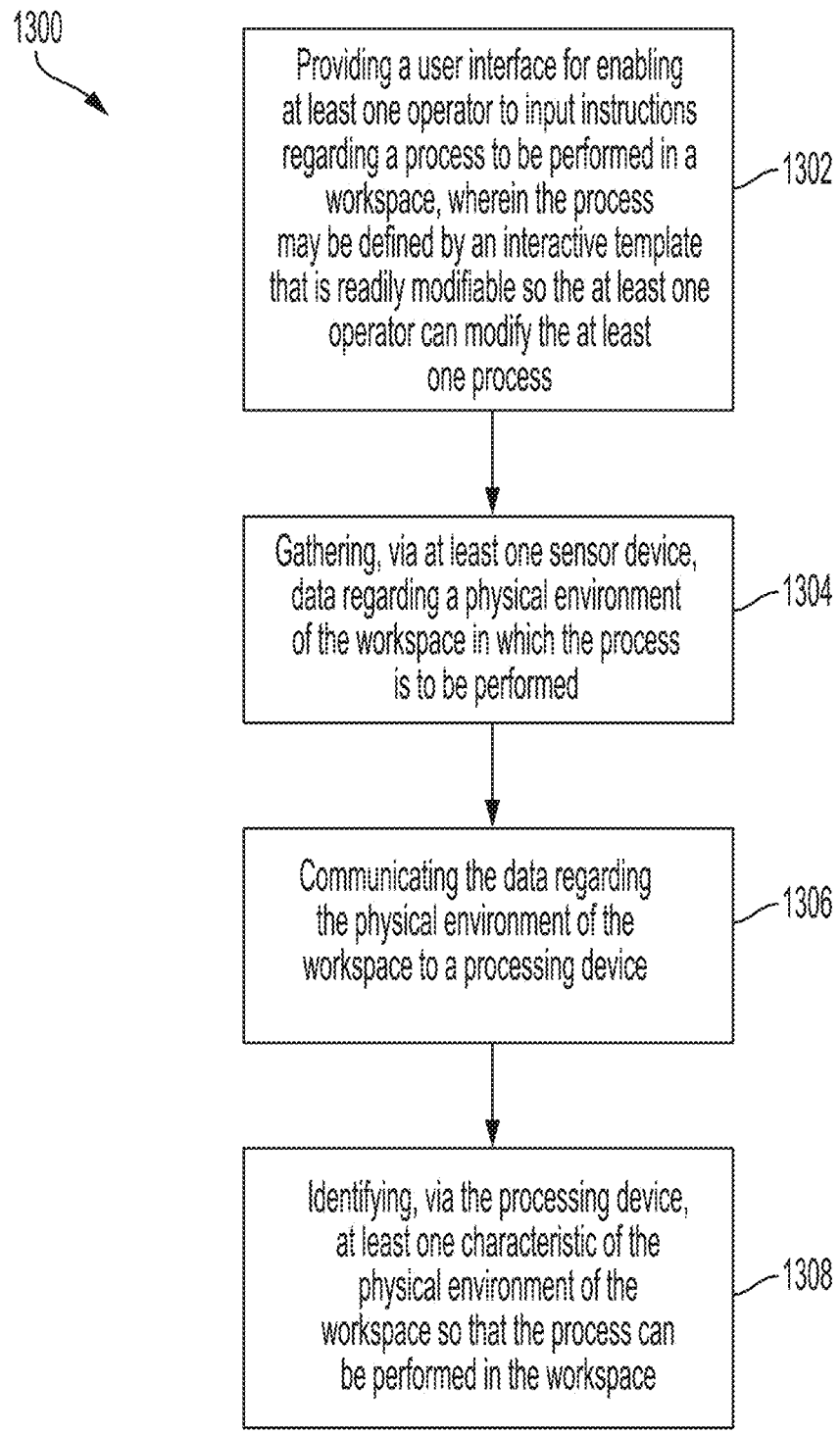
FIG. 13 depicts a flowchart of a method for facilitating a manufacturing process in accordance with one embodiment.

FIG. 13 depicts a flowchart of a method 1300 for facilitating a manufacturing process in accordance with one embodiment. Step 1302 involves providing a user interface for enabling at least one operator to input instructions regarding a process to be performed in a workspace, wherein the process may be defined by an interactive template that is readily modifiable so the at least one operator can modify the at least one process. The user interface may be configured as a PC, laptop, tablet, smartphone, or the like. The interactive template may be similar to the interactive template discussed in steps 902 and 904 of FIG. 9, for example.

Step 1304 involves gathering, via at least one sensor device, data regarding a physical environment of the workspace in which the process is to be performed. This data may relate to the position/location of certain devices in the workspace such as a table, tool device, machinery, and other objects in the environment. This information may be gathered by sensor devices such as LIDAR, stereoscopic cameras, or the like.

Step 1306 involves communicating the data regarding the physical environment of the workspace to a processing device. This information may be communicated via any type of hardwired or wireless connection.

Step 1308 involves identifying, via the processing device, at least one characteristic of the physical environment of the workspace so that the process can be performed in the workspace. The processing device may identify the locations of certain devices, for example, so that the process, as defined by an operator in step 1302, can be performed in the physical environment.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

The invention claimed is:

1. A method of operating a manufacturing system, the method comprising:
defining a manufacturing process using an interactive template retrievable from a storage by a server, wherein the interactive template includes a plurality of parameterized widgets defining an operation of a plurality of machines located on a factory floor and executing at least one step of the manufacturing process based on sensor values gathered by sensors collecting information from the factory floor for monitoring the at least one step during the manufacturing process;
receiving, by the server, at least one first modification to the plurality of parameterized widgets in the interactive template from a first processing device that presents a first user interface to at least one first operator, the at least one first modification is performed by a drag and drop operation performed by the at least one first operator;

receiving, by the server, at least one second modification to the plurality of parameterized widgets in the interactive template from a second processing device that presents a second user interface to at least one second operator, the at least one second modification is performed by a drag and drop operation performed by the at least one second operator;

providing, via the server, a modified version of the interactive template having the at least one first modification and the at least one second modification, to a third processing device that presents a third user interface to guide performance of the manufacturing process;

gathering, by the server, data related to the performance of the at least one step of the manufacturing process according to the modified version;

converting, by the server, the gathered data related to the performance of the at least one step of the manufacturing process into manufacturing results data; and providing, via the server, the manufacturing results data to for display to allow an operator to edit graphically the interactive template to improve execution of the manufacturing process, wherein the plurality of parameterized widgets comprises one or more virtual buttons operable to change a state of the manufacturing process and visualizations or graphs resulting from an analysis of the manufacturing results data.

2. The method of claim 1, further comprising tracking at least one identity of the at least one first operator and the at least one second operator making the at least one first and at least one second modification to the manufacturing process, respectively.

3. The method of claim 1, wherein the manufacturing process further includes at least one conditional test.

4. The method of claim 1 further comprising allocating at least one piece of machinery to perform at least one step of the manufacturing process, wherein the at least one piece of machinery comprises a plurality of pieces of machinery of a plurality of types.

5. The method of claim 1, the method further comprising: converting the gathered data into manufacturing performance data.

6. The method of claim 5 further comprising issuing commands altering performance of the manufacturing process in response to the gathered data or the manufacturing performance data.

7. The method of claim 5 wherein the conversion of the gathered data into the manufacturing performance data comprises grouping the gathered data into one or more groups according to at least one parameter, and providing the one or more groups as the manufacturing performance.

8. The method of claim 7 wherein the at least one parameter is selected from the group consisting of time period, time of day, a physical configuration of components, gathered sensor data, and data provided by an operator during execution of the manufacturing process.

9. The method of claim 5 wherein the conversion of the gathered data into the manufacturing performance data comprises processing the gathered data to determine individual operator performance.

10. The method of claim 1, wherein converting the gathered data into the manufacturing results comprises:

classifying the gathered data into at least one classification;

distributing the gathered data to at least one database selected from a plurality of databases, wherein the selection of the at least one database is dependent on the at least one classification;

querying, using an analytic module, at least one instance of data from the at least one database; and converting the at least one instance of queried data into the manufacturing results data.

11. The method of claim 1 further comprising:

providing a user interface for enabling at least one operator to input instructions regarding a process to be performed in a workspace;

gathering, via at least one sensor device, data regarding a physical environment of the workspace in which the process is to be performed; communicating the data regarding the physical environment of the workspace to the server; and identifying at least one characteristic of the physical environment of the workspace related to performing the process in the workspace.

12. The method of claim 11 wherein the user interface, the at least one sensor device, and at least one processor are contained in a same physical package, and wherein the storage is network connected.

13. A manufacturing system comprising:

a storage that stores an interactive template, wherein the interactive template includes a plurality of parameterized widgets defining an operation of a plurality of machines located on a factory floor and executing at least one step of a manufacturing process based on sensor values gathered by sensors collecting information from the factory floor for monitoring the at least one step during the manufacturing process; and a server configured to:

receive at least one first modification to the plurality of parameterized widgets in the interactive template from a first processing device that presents a first user interface to at least one first operator, the at least one first modification is performed by a drag and drop operation performed by the at least one first operator;

receive at least one second modification plurality of parameterized widgets in the to the interactive template from a second processing device that presents a second user interface to at least one second operator, the at least one second modification is performed by a drag and drop operation performed by the at least one second operator;

provide a modified version of the interactive template having the at least one first modification and the at least one second modification, to a third processing device that presents a third user interface to guide performance of the manufacturing process;

gather data related to a performance of the at least one step of the manufacturing process according to the modified version;

convert the gathered data into manufacturing results data; and provide the manufacturing results data for display to allow an operator to edit graphically the interactive template to improve execution of the manufacturing process, wherein the plurality of parameterized widgets comprises one or more virtual buttons operable to change a state of the manufacturing process and visualizations or graphs resulting from an analysis of the manufacturing results data.

14. The system of claim 13 wherein the server is further configured to track at least one identity of the at least one first operator modifying the manufacturing process.

15. The system of claim 13, wherein the manufacturing process further includes at least one conditional test.

16. The system of claim 13 further comprising a tool, a device or a piece of machinery for performing the at least one step of the manufacturing process, wherein the system further comprises a sensor for gathering the data related to the performance of the at least one step.

17. The system of claim 13 further comprising:
the first user interface for presenting the interactive template to the at least one first operator to enable the at least one first operator to create a process, view a process, test a process, or modify a process in substantially real time.

18. The system of claim 17, wherein:
testing the manufacturing process comprises executing the manufacturing process on at least one piece of machinery;
the interactive template is configured to receive at least one operational parameter from the at least one piece of machinery; and
the first user interface displays the at least one received operational parameter in substantially real time.

19. The system of claim 18 wherein the interactive template will not execute in the absence of the at least one piece of machinery.

20. The system of claim 18 wherein making at least one first modification to the manufacturing process comprises associating the at least one piece of machinery with the manufacturing process when the manufacturing process is executed.

21. The system of claim 17, wherein testing the manufacturing process comprises simulating execution of the manufacturing process.

22. The system of claim 17 further configured to identify errors in a created process prior to execution of a runtime configuration.

23. The system of claim 13 wherein
the storage is network-connected and stores a master database relating to the manufacturing process-performed at a facility; and
the system further comprises a local server located at the facility containing a copy of the master database so that the manufacturing process may be performed at the facility during a first time period in which the network-connected storage is not accessible, wherein the local server is configured to:
store data related to the performance of the manufacturing process during the first time period in which the network-connected storage is not accessible, and
communicate the data related to the performance of the manufacturing process to the network-connected storage during a second time period in which the network-connected storage is accessible.

24. The system of claim 13, further comprising:
at least one piece of machinery located in a first hierarchy layer and configured to perform at least a portion of the manufacturing process, wherein: the manufacturing process includes at least one step;
the server is located in a second hierarchy layer and is in operable communication with the at least one piece of machinery; and
the server is configured to be in operable communication with at least a second piece of machinery based on the second piece of machinery being located in the first hierarchy layer and the server being located in the second hierarchy layer; and
a plurality of user interfaces associated with the at least one piece of machinery, the plurality of user interfaces comprising the first and second user interfaces, wherein at least two of the plurality of user interfaces are configured to display a same step of the manufacturing process substantially simultaneously.

25. The system of claim 24 wherein the server maintains a state associated with the performance of the manufacturing process, wherein changes to the maintained state are reflected in the plurality of user interfaces.

* * * * *